(12) United States Patent
Frolikov

(10) Patent No.: US 11,249,922 B2
(45) Date of Patent: *Feb. 15, 2022

(54) NAMESPACE MAPPING STRUCTURAL ADJUSTMENT IN NON-VOLATILE MEMORY DEVICES

(71) Applicant: Micron Technology, Inc., Boise, ID (US)

(72) Inventor: Alex Frolikov, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/878,383

(22) Filed: May 19, 2020

(65) Prior Publication Data

US 2020/0278933 A1 Sep. 3, 2020

Related U.S. Application Data

(63) Continuation of application No. 15/814,934, filed on Nov. 16, 2017, now Pat. No. 10,678,703.

(51) Int. Cl.
*G06F 12/1009* (2016.01)

(52) U.S. Cl.
CPC .. *G06F 12/1009* (2013.01); *G06F 2212/1016* (2013.01); *G06F 2212/202* (2013.01); *G06F 2212/657* (2013.01)

(58) Field of Classification Search
None
See application file for complete search history.

(56) References Cited

U.S. PATENT DOCUMENTS

| 5,430,856 | A | 7/1995 | Kinoshita |
| 6,529,921 | B1 | 3/2003 | Berkowitz et al. |
| 7,509,473 | B2 * | 3/2009 | Horn ............... G06F 3/0607 |
| | | | 711/206 |

(Continued)

FOREIGN PATENT DOCUMENTS

| WO | 2008128212 | 10/2008 |
| WO | 2010088148 | 8/2010 |

OTHER PUBLICATIONS

Dave Minturn, J. Metz, "Under the Hood with NVMe over Fabrics", Dec. 15, 2015.

(Continued)

*Primary Examiner* — Yaima Rigol
(74) *Attorney, Agent, or Firm* — Greenberg Traurig

(57) ABSTRACT

A computer storage device having a host interface, a controller, non-volatile storage media, and firmware. The firmware instructs the controller to: allocate a named portion of the non-volatile storage device; generate, according to a first block size, first block-wise mapping data; translate, using the first block-wise mapping data, logical addresses defined in the named portion to logical addresses defined for the entire non-volatile storage media, which can then be further translated to physical addresses in a same way for all named portions; determine a second block size; generate, according to the second block size, second block-wise mapping data; translate, using the second block-wise mapping data, the logical addresses defined in the named portion to the logical addresses defined for the entire non-volatile storage media.

20 Claims, 22 Drawing Sheets

(56) References Cited

U.S. PATENT DOCUMENTS

| | | | |
|---|---|---|---|
| 7,904,636 B2* | 3/2011 | Wu | G06F 12/0246 711/103 |
| 8,498,417 B1 | 7/2013 | Harwood et al. | |
| 8,738,621 B2 | 5/2014 | Hinrichs | |
| 8,862,590 B2 | 10/2014 | Sheehan | |
| 9,116,904 B2 | 8/2015 | Christiansen et al. | |
| 9,430,480 B1 | 8/2016 | Bono | |
| 9,501,392 B1 | 11/2016 | Weingarten | |
| 9,529,735 B2 | 12/2016 | Hashimoto | |
| 10,223,254 B1 | 3/2019 | Frolikov | |
| 10,437,476 B2 | 10/2019 | Frolikov | |
| 10,503,404 B2 | 12/2019 | Frolikov | |
| 10,642,488 B2 | 5/2020 | Frolikov | |
| 10,678,703 B2 | 6/2020 | Frolikov | |
| 10,915,440 B2 | 2/2021 | Frolikov | |
| 10,969,963 B2 | 4/2021 | Frolikov | |
| 2004/0236924 A1 | 11/2004 | Johnson et al. | |
| 2005/0108269 A1 | 5/2005 | Szajdecki et al. | |
| 2006/0020745 A1* | 1/2006 | Conley | G06F 12/0246 711/103 |
| 2008/0109662 A1 | 5/2008 | Natarajan et al. | |
| 2009/0007162 A1 | 1/2009 | Sheehan | |
| 2009/0092252 A1 | 4/2009 | Noll et al. | |
| 2009/0198899 A1 | 8/2009 | Revanuru | |
| 2010/0036889 A1* | 2/2010 | Joshi | G06F 16/182 707/821 |
| 2010/0095057 A1 | 4/2010 | Li et al. | |
| 2010/0191779 A1 | 7/2010 | Hinrichs | |
| 2010/0262583 A1 | 10/2010 | Ingen et al. | |
| 2010/0268872 A1 | 10/2010 | Lee et al. | |
| 2010/0318760 A1 | 12/2010 | So et al. | |
| 2011/0022566 A1 | 1/2011 | Beaverson et al. | |
| 2011/0106771 A1 | 5/2011 | McDonald et al. | |
| 2012/0272037 A1 | 10/2012 | Bayer et al. | |
| 2013/0080732 A1 | 3/2013 | Nellans et al. | |
| 2014/0280392 A1 | 9/2014 | Christiansen et al. | |
| 2014/0281040 A1 | 9/2014 | Liu | |
| 2014/0310499 A1 | 10/2014 | Sundararaman et al. | |
| 2015/0012538 A1 | 1/2015 | Sheehan | |
| 2015/0242309 A1 | 8/2015 | Talagala et al. | |
| 2015/0278397 A1 | 10/2015 | Hendrickson et al. | |
| 2015/0319243 A1 | 11/2015 | Hussain et al. | |
| 2016/0062885 A1* | 3/2016 | Ryu | G06F 12/0246 711/103 |
| 2016/0124843 A1 | 5/2016 | Kanno | |
| 2016/0283125 A1 | 9/2016 | Hashimoto et al. | |
| 2016/0342463 A1 | 11/2016 | Oshima | |
| 2017/0024137 A1 | 1/2017 | Kanno | |
| 2017/0149924 A1* | 5/2017 | Peterson | G06F 12/0804 |
| 2017/0242617 A1 | 8/2017 | Walsh et al. | |
| 2017/0262175 A1 | 9/2017 | Kanno | |
| 2017/0262228 A1* | 9/2017 | Kanno | G11C 16/10 |
| 2017/0344430 A1* | 11/2017 | Greer | G06F 11/1456 |
| 2017/0351431 A1 | 12/2017 | Dewitt et al. | |
| 2018/0018917 A1 | 1/2018 | Yoo et al. | |
| 2018/0024920 A1 | 1/2018 | Thomas et al. | |
| 2018/0088805 A1 | 3/2018 | Kanno | |
| 2018/0088811 A1 | 3/2018 | Kanno | |
| 2018/0089101 A1 | 3/2018 | Sternberg et al. | |
| 2018/0121344 A1 | 5/2018 | Seo et al. | |
| 2018/0239697 A1 | 8/2018 | Huang et al. | |
| 2018/0260319 A1 | 9/2018 | Thompson et al. | |
| 2018/0260334 A1 | 9/2018 | Asano et al. | |
| 2018/0275871 A1 | 9/2018 | Ptak | |
| 2018/0275873 A1 | 9/2018 | Frid et al. | |
| 2019/0121543 A1 | 4/2019 | Frolikov | |
| 2019/0121547 A1 | 4/2019 | Frolikov | |
| 2019/0121548 A1 | 4/2019 | Frolikov | |
| 2019/0146907 A1 | 5/2019 | Frolikov | |
| 2019/0146912 A1 | 5/2019 | Frolikov | |
| 2019/0146927 A1 | 5/2019 | Frolikov | |
| 2019/0146931 A1 | 5/2019 | Frolikov | |
| 2019/0347010 A1 | 11/2019 | Frolikov | |
| 2019/0361610 A1 | 11/2019 | Frolikov | |
| 2020/0257449 A1 | 8/2020 | Frolikov | |

OTHER PUBLICATIONS

Hermann Strass, "An Introduction to NVMe", copyrighted 2016.

International Search Report and Written Opinion, Int. App. No. PCT/US2018/056076, dated Jan. 30, 2019.

International Search Report and Written Optinion, Int. Pat. App. Ser. PCT/US2018/059377, dated Feb. 21, 2019.

J. Metz, Creating Higher Performance Solid State Storage with Non-Volatile Memory Express (NVMe), SNIA, Data Storage Innovation Conference, 2015.

Kevin Marks, "An NVM Express Tutorial", Flash Memory Summit 2013, created on Aug. 7, 2013.

NVM Express, Revision 1.2, Nov. 3, 2014.

Title: Namespace Management in Non-Volatile memory Devices U.S. Appl. No. 15/790,979, filed Oct. 23, 2017, Inventor: Alex Frolikov, Status: Patented Case, Status Date: Jun. 10, 2019.

Title: Namespace Management in Non-Volatile Memory Devices U.S. Appl. No. 16/535,728, filed Aug. 8, 2019, Inventor: Alex Frolikov, Status: Non Final Action, Status Date: Jan. 4, 2021.

Title: Namespaces Allocation in Non-Volatile Memory Devices U.S. Appl. No. 15/790,882, filed Oct. 23, 2017, Inventor: Alex Frolikov, Status: Patented Case, Status Date: Sep. 18, 2019.

Title: Namespaces Allocation in Non-Volatile Memory Devices U.S. Appl. No. 16/520,204, filed Jul. 23, 2019, Inventor: Alex Frolikov, Status: Patented Case, Status Date: Jun. 16, 2020.

Title: Namespaces Allocation in Non-Volatile Memory Devices U.S. Appl. No. 17/184,487, filed Feb. 24, 2021, Inventor: Alex Frolikov, Status: Application Dispatched from Preexam, Not Yet Docketed, Status Date: Mar. 8, 2021.

Title: Namespace Change Propagation in Non-Volatile Memory Devices U.S. Appl. No. 15/814,634, filed Nov. 16, 2017, Inventor: Alex Frolikov, Status: Patented Case, Status Date: Feb. 13, 2019.

Title: Namespace Change Propagation in Non-Volatile Memory Devices U.S. Appl. No. 16/236,897, filed Dec. 31, 2018, Inventor: Alex Frolikov, Status: Patented Case, Status Date: Sep. 18, 2020.

Title: Namespace Size Adjustment in Non-Volatile Memory Devices U.S. Appl. No. 15/790,969, filed Oct. 23, 2017, Inventor: Alex Frolikov, Status: Patented Case, Status Date: Sep. 4, 2019.

Title: Namespace Size Adjustment in Non-Volatile Memory Devices U.S. Appl. No. 16/859,800, filed Apr. 27, 2020, Inventor: Alex Frolikov, Status: Docketed New Case—Ready for Examination, Status Date: May 26, 2020.

Title: Namespace Encryption in Non-Volatile Memory Devices U.S. Appl. No. 15/814,679, filed Nov. 16, 2017, Inventor: Alex Frolikov, Status: Docketed New Case—Ready for Examination, Status Date: Dec. 30, 2020.

Title: Namespace Mapping Optimization in Non-Volatile Memory Devices U.S. Appl. No. 15/814,785, filed Nov. 16, 2017, Inventor: Alex Frolikov, Status: Patented Case, Status Date: May 14, 2020.

Title: Namespace Mapping Optimization in Non-Volatile Memory Devices U.S. Appl. No. 17/170,003, filed Feb. 8, 2021, Inventor: Alex Frolikov, Status: Application Dispatched from Preexam, Not Yet Docketed, Status Date: Feb. 19, 2021.

Title: Namespace Mapping Structural Adjustment in Non-Volatile Memory Devices U.S. Appl. No. 15/814,934, filed Nov. 16, 2017, Inventor: Alex Frolikov, Status: Patented Case, Status Date: Apr. 29, 2019.

* cited by examiner

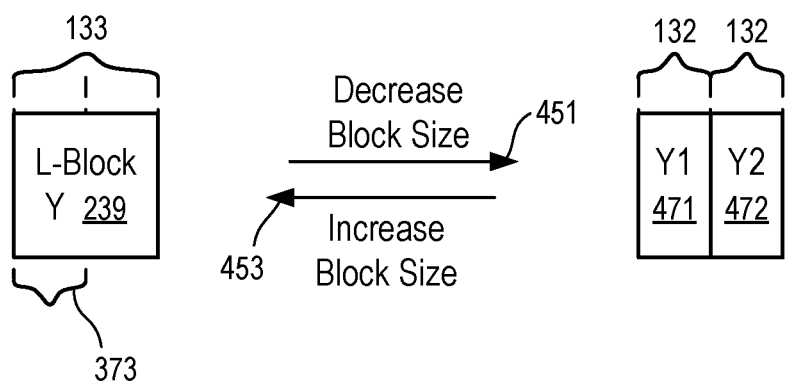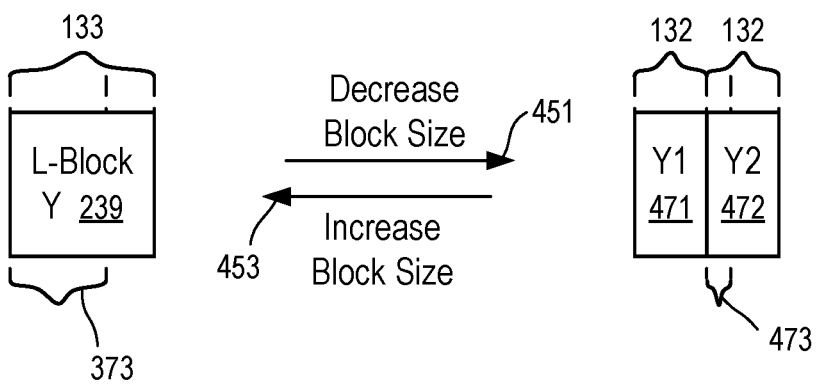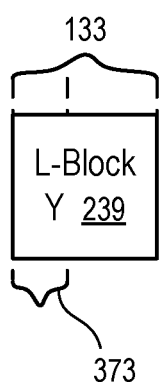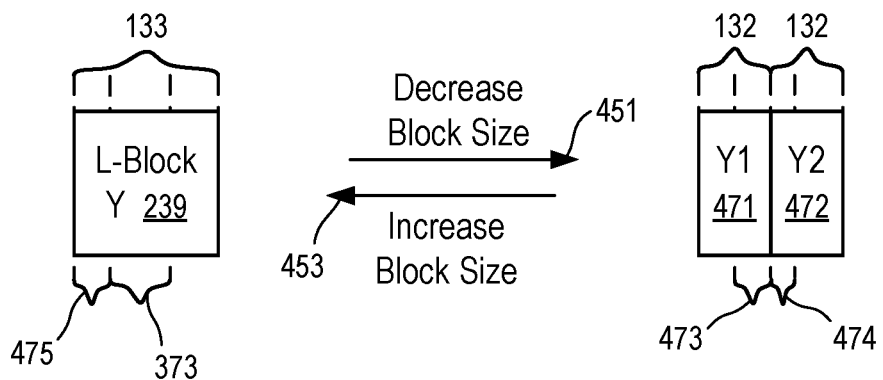
FIG. 27
FIG. 28
FIG. 29
FIG. 30 us 11,249,922 b2

NAMESPACE MAPPING STRUCTURAL ADJUSTMENT IN NON-VOLATILE MEMORY DEVICES

RELATED APPLICATIONS

The present application is a continuation application of U.S. patent application Ser. No. 15/814,934, filed Nov. 16, 2017, now U.S. Pat. No. 10,678,703, issued Jun. 9, 2020, and entitled "Namespace Mapping Structural Adjustment in Non-Volatile Memory Devices," the entire disclosure of which application is hereby incorporated herein by reference.

FIELD OF THE TECHNOLOGY

At least some embodiments disclosed herein relate to computer storage devices in general and more particularly, but not limited to structural adjustments of namespace mapping in non-volatile storage devices.

BACKGROUND

Typical computer storage devices, such as hard disk drives (HDDs), solid state drives (SSDs), and hybrid drives, have controllers that receive data access requests from host computers and perform programmed computing tasks to implement the requests in ways that may be specific to the media and structure configured in the storage devices, such as rigid rotating disks coated with magnetic material in the hard disk drives, integrated circuits having memory cells in solid state drives, and both in hybrid drives.

A standardized logical device interface protocol allows a host computer to address a computer storage device in a way independent from the specific media implementation of the storage device.

For example, Non-Volatile Memory Host Controller Interface Specification (NVMHCI), also known as NVM Express (NVMe), specifies the logical device interface protocol for accessing non-volatile storage devices via a Peripheral Component Interconnect Express (PCI Express or PCIe) bus.

BRIEF DESCRIPTION OF THE DRAWINGS

The embodiments are illustrated by way of example and not limitation in the figures of the accompanying drawings in which like references indicate similar elements.

FIGS. 27-30 illustrate namespace mapping adjustments in implementing block size changes.

DETAILED DESCRIPTION

Figure 1:
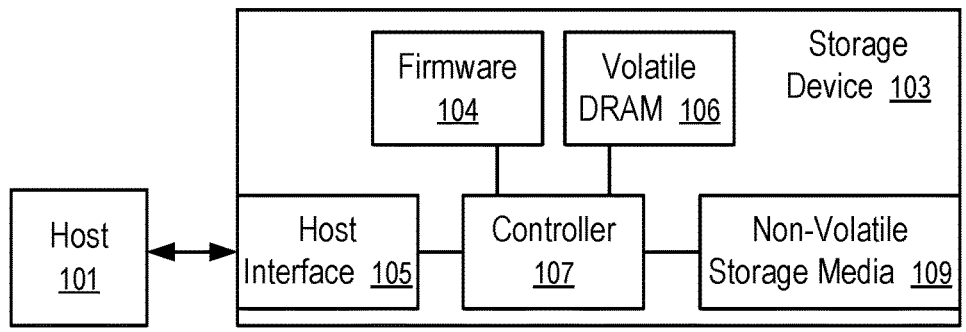
FIG. 1 shows a computer system in which embodiments of inventions disclosed herein can be implemented.

At least some embodiments disclosed herein provide efficient and flexible ways to implement logical storage allocations and management in storage devices.

Physical memory elements of a storage device can be arranged as logical memory blocks addressed via Logical Block Addressing (LBA). A logical memory block is the smallest LBA addressable memory unit; and each LBA address identifies a single logical memory block that can be mapped to a particular physical address of a memory unit in the storage device.

The concept of namespace for storage device is similar to the concept of partition in a hard disk drive for creating logical storages. Different portions of a storage device can be allocated to different namespaces and thus can have LBA addresses configured independently from each other within their respective namespaces. Each namespace identifies a quantity of memory of the storage device addressable via LBA. A same LBA address can be used in different namespaces to identify different memory units in different portions of the storage device. For example, a first namespace allocated on a first portion of the storage device having n memory units can have LBA addresses ranging from 0 to n−1; and a second namespace allocated on a second portion of the storage device having m memory units can have LBA addresses ranging from 0 to m−1.

A host computer of the storage device may send a request to the storage device for the creation, deletion, or reservation of a namespace. After a portion of the storage capacity of the storage device is allocated to a namespace, an LBA address in the respective namespace logically represents a particular memory unit in the storage media, although the particular memory unit logically represented by the LBA address in the namespace may physically correspond to different memory units at different time instances (e.g., as in SSDs).

There are challenges in efficiently implementing the mapping of LBA addresses defined in multiple namespaces into physical memory elements in the storage device and in efficiently using the storage capacity of the storage device, especially when it is desirable to dynamically allocate, delete and further allocate on the storage device multiple namespaces with different, varying sizes. For example, the portion of the storage capacity allocated to a deleted namespace may not be sufficient to accommodate the allocation of a subsequent namespace that has a size larger than the deleted namespace; and repeated cycles of allocation and deletion may lead to fragmentation of the storage capacity that may lead to inefficient mapping of LBA addresses to physical addresses and/or inefficient usage of the fragmented storage capacity of the storage device.

At least some embodiments of the inventions disclosed herein address the challenges through a block by block map from LBA addresses defined in allocated namespaces to LBA addresses defined on the entire storage capacity of the storage device. After mapping the LBA addresses defined in allocated namespaces into the LBA addresses defined on the entire storage capacity of the storage device, the corresponding LBA addresses defined on the entire storage capacity of the storage device can be further mapped to the physical storage elements in a way independent of the allocations of namespaces on the device. When the block by block mapping of LBA addresses is based on a predetermined size block size, an efficient data structure can be used for the efficient computation of LBA addresses defined on the entire storage capacity of the storage device from the LBA addresses defined in the allocated namespaces.

For example, the entire storage capacity of the storage device can be divided into blocks of LBA addresses according to a predetermined block size for flexibility and efficiency in namespace management. The block size represents the number of LBA addresses in a block. A block of the predetermined block size may be referred to hereafter as an L-block, a full L-block, a full LBA block, an LBA block, or sometimes simply as a full block or a block. The block by block namespace mapping from LBA addresses defined in allocated namespaces to LBA addresses defined on the entire storage capacity of the storage device allows the allocation of non-contiguous LBA addresses defined on the entire storage to a namespace, which can reduce fragmentation of the storage capacity caused by cycles of namespace allocation and deletion and improve efficiency in the usage of the storage capacity.

Preferably, the block size of L-blocks is predetermined and is a power of two (2) to simplify computations involved in mapping of addresses for the L-blocks. In other instances, an optimized block size may be predicted or calculated, using an artificial intelligence technique, through machine learning from the namespace usage histories in the storage device and/or other similarly used storage devices.

One embodiment disclosed herein includes the dynamic adjustment of the block-size of L-blocks. After namespace mapping is established for one or more namespaces allocated on a storage device according to a current block size, an improved block size may be determined from the usage history of the storage device and/or the predicted usage pattern of the storage device. The improved block size can be rounded to the closest number that is a fraction or multiple of the current block size such that the dynamic block-size change for namespace mapping can be implemented through splitting or merging L-blocks. For example, the L-blocks that are of the current block size and are currently allocated to the existing one or more namespaces can be split or combined as new L-blocks of the improved block size that are allocated to the existing namespaces allocated according to the improved block size. Preferably, the improved block size is also rounded to the closest number that is a power of two (2) to simplify computations involved in mapping of addresses for the namespaces.

FIG. 1 shows a computer system in which embodiments of inventions disclosed herein can be implemented.

In FIG. 1, a host (101) communicates with a storage device (103) via a communication channel having a predetermined protocol. The host (101) can be a computer having one or more Central Processing Units (CPUs) to which computer peripheral devices, such as the storage device (103), may be attached via an interconnect, such as a computer bus (e.g., Peripheral Component Interconnect (PCI), PCI eXtended (PCI-X), PCI Express (PCIe)), a communication portion, and/or a computer network.

The computer storage device (103) can be used to store data for the host (101). Examples of computer storage devices in general include hard disk drives (HDDs), solid state drives (SSDs), flash memory, dynamic random-access memory, magnetic tapes, network attached storage device, etc. The storage device (103) has a host interface (105) that implements communications with the host (101) using the communication channel. For example, the communication channel between the host (101) and the storage device (103) is a PCIe bus in one embodiment; and the host (101) and the storage device (103) communicate with each other using NVMe protocol.

In some implementations, the communication channel between the host (101) and the storage device (103) includes a computer network, such as a local area network, a wireless local area network, a wireless personal area network, a cellular communications network, a broadband high-speed always-connected wireless communication connection (e.g., a current or future generation of mobile network link); and the host (101) and the storage device (103) can be configured to communicate with each other using data storage management and usage commands similar to those in NVMe protocol.

The storage device (103) has a controller (107) that runs firmware (104) to perform operations responsive to the communications from the host (101). Firmware in general is a type of computer program that provides control, monitoring and data manipulation of engineered computing devices. In FIG. 1, the firmware (104) controls the operations of the controller (107) in operating the storage device (103), such as the allocation of namespaces for storing and accessing data in the storage device (103), as further discussed below.

The storage device (103) has non-volatile storage media (109), such as magnetic material coated on rigid disks, and memory cells in an integrated circuit. The storage media (109) is non-volatile in that no power is required to maintain the data/information stored in the non-volatile storage media (109), which data/information can be retrieved after the non-volatile storage media (109) is powered off and then powered on again. The memory cells may be implemented using various memory/storage technologies, such as NAND gate based flash memory, phase-change memory (PCM), magnetic memory (MRAM), resistive random-access memory, and 3D XPoint, such that the storage media (109) is non-volatile and can retain data stored therein without power for days, months, and/or years.

The storage device (103) includes volatile Dynamic Random-Access Memory (DRAM) (106) for the storage of run-time data and instructions used by the controller (107) to improve the computation performance of the controller (107) and/or provide buffers for data transferred between the host (101) and the non-volatile storage media (109). DRAM (106) is volatile in that it requires power to maintain the data/information stored therein, which data/information is lost immediately or rapidly when the power is interrupted.

Volatile DRAM (106) typically has less latency than non-volatile storage media (109), but loses its data quickly when power is removed. Thus, it is advantageous to use the volatile DRAM (106) to temporarily store instructions and data used for the controller (107) in its current computing task to improve performance. In some instances, the volatile DRAM (106) is replaced with volatile Static Random-Access Memory (SRAM) that uses less power than DRAM in some applications. When the non-volatile storage media (109) has data access performance (e.g., in latency, read/write speed) comparable to volatile DRAM (106), the volatile DRAM (106) can be eliminated; and the controller (107) can perform computing by operating on the non-volatile storage media (109) for instructions and data instead of operating on the volatile DRAM (106).

For example, cross point storage and memory devices (e.g., 3D XPoint memory) have data access performance comparable to volatile DRAM (106). A cross point memory device uses transistor-less memory elements, each of which has a memory cell and a selector that are stacked together as a column. Memory element columns are connected via two perpendicular lays of wires, where one lay is above the memory element columns and the other lay below the memory element columns. Each memory element can be individually selected at a cross point of one wire on each of the two layers. Cross point memory devices are fast and non-volatile and can be used as a unified memory pool for processing and storage.

In some instances, the controller (107) has in-processor cache memory with data access performance that is better than the volatile DRAM (106) and/or the non-volatile storage media (109). Thus, it is preferred to cache parts of instructions and data used in the current computing task in the in-processor cache memory of the controller (107) during the computing operations of the controller (107). In some instances, the controller (107) has multiple processors, each having its own in-processor cache memory.

Optionally, the controller (107) performs data intensive, in-memory processing using data and/or instructions organized in the storage device (103). For example, in response to a request from the host (101), the controller (107) performs a real time analysis of a set of data stored in the storage device (103) and communicates a reduced data set to the host (101) as a response. For example, in some applications, the storage device (103) is connected to real time sensors to store sensor inputs; and the processors of the controller (107) are configured to perform machine learning and/or pattern recognition based on the sensor inputs to support an artificial intelligence (AI) system that is implemented at least in part via the storage device (103) and/or the host (101).

In some implementations, the processors of the controller (107) are integrated with memory (e.g., 106 or 109) in computer chip fabrication to enable processing in memory and thus overcome the von Neumann bottleneck that limits computing performance as a result of a limit in throughput caused by latency in data moves between a processor and memory configured separately according to the von Neumann architecture. The integration of processing and memory increases processing speed and memory transfer rate, and decreases latency and power usage.

The storage device (103) can be used in various computing systems, such as a cloud computing system, an edge computing system, a fog computing system, and/or a stand-alone computer. In a cloud computing system, remote computer servers are connected in a network to store, manage, and process data. An edge computing system optimizes cloud computing by performing data processing at the edge of the computer network that is close to the data source and thus reduces data communications with a centralize server and/or data storage. A fog computing system uses one or more end-user devices or near-user edge devices to store data and thus reduces or eliminates the need to store the data in a centralized data warehouse.

At least some embodiments of the inventions disclosed herein can be implemented using computer instructions executed by the controller (107), such as the firmware (104). In some instances, hardware circuits can be used to implement at least some of the functions of the firmware (104). The firmware (104) can be initially stored in the non-volatile storage media (109), or another non-volatile device, and loaded into the volatile DRAM (106) and/or the in-processor cache memory for execution by the controller (107).

For example, the firmware (104) can be configured to use the techniques discussed below in managing namespaces. However, the techniques discussed below are not limited to being used in the computer system of FIG. 1 and/or the examples discussed above.

Figure 2:
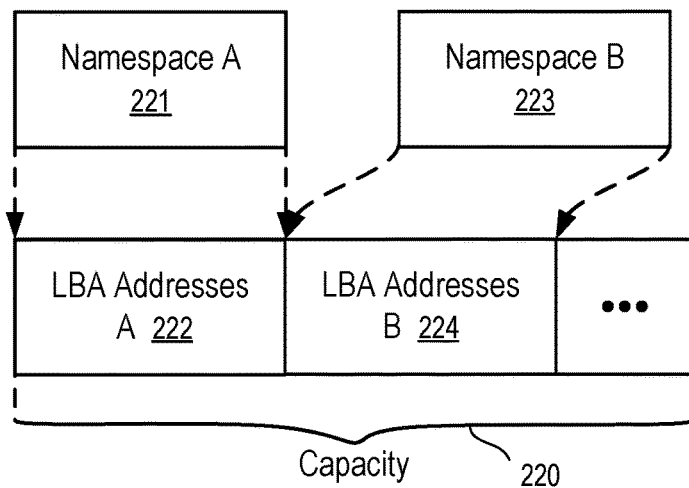
FIG. 2 illustrates an example of allocating multiple namespaces directly according to the requested sizes of the namespaces.

FIG. 2 illustrates an example of allocating multiple namespaces directly according to the requested sizes of the namespaces.

For example, the method of FIG. 2 can be implemented in the storage device (103) illustrated in FIG. 1. The non-volatile storage media (109) of the storage device (103) has memory units that may be identified by a range of LBA addresses (222, 224, . . . ), where the range corresponds to a memory capacity (220) of the non-volatile storage media (109).

In FIG. 2, namespaces (221, 223) are allocated directly from the contiguous, available region of the capacity (220). When one of the previously allocated namespaces (221, 223) is deleted, the remaining capacity (220), free for allocation to another namespace, may become fragmented, which limits the options for the selection of the size of a subsequent new namespace.

For example, when the namespace (221) illustrated in FIG. 2 is deleted and the namespace (223) remains to be allocated in a region as illustrated in FIG. 2, the free portions of the capacity (220) are fragmented, limiting the choices of the size of the subsequent new namespace to be the same as, or smaller than, the size of the namespace (221).

To improve the flexibility for dynamic namespace management and support iterations of creation and deletion of namespaces of different sizes, a block-wise mapping/allocation of logical addresses can be used, as further discussed below.

Figure 3:
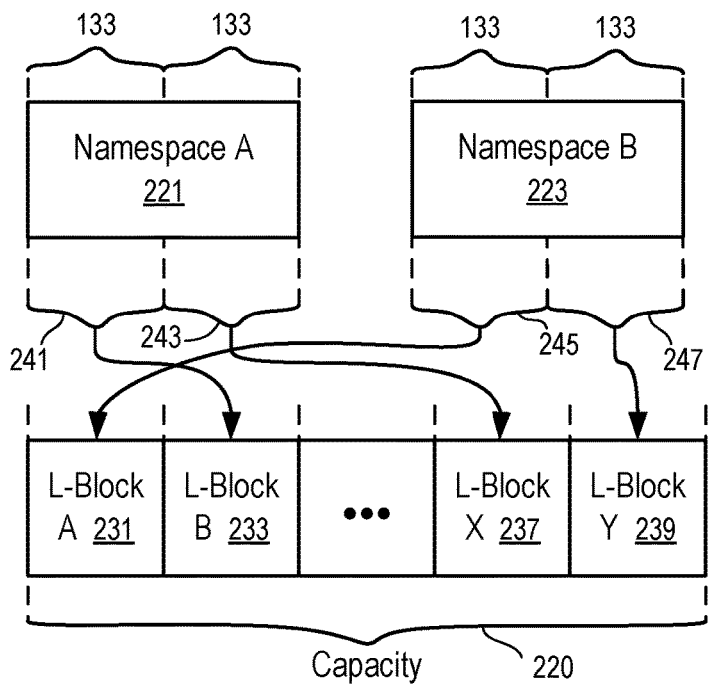
FIG. 3 illustrates an example of allocating namespaces via mapping blocks of logical addresses.

FIG. 3 illustrates an example of allocating namespaces via mapping blocks of logical addresses.

In FIG. 3, the capacity (220) of the storage device (103) is divided into L-blocks, or blocks (231, 233, . . . , 237, 239) of LBA addresses that are defined on the entire capacity of the storage device (103). To improve efficiency in address mapping, the L-blocks (231, 233, ..., 237, 239) are designed to have the same size (133). Preferably, the block size (133) is a power of two (2), such that operations of division, modulo, and multiplication involving the block size (133) can be efficiently performed via shift operations.

After the capacity (220) is divided into L-blocks (231, 233, ..., 237, 239) illustrated in FIG. 3, the allocation of a namespace (e.g., 221 or 223) does not have to be from a contiguous region of the capacity (220). A set of L-blocks (231, 233, ..., 237, 239) from non-contiguous regions of the capacity (220) can be allocated from a namespace (e.g., 221 or 223). Thus, the impact of fragmentation on the size availability in creating new namespaces, which impact may result from the deletion of selected previously-created namespaces, is eliminated or reduced.

For example, non-contiguous L-blocks (233 and 237) in the capacity (220) can be allocated to contiguous regions (241 and 243) of the namespace (221) through block-wise mapping; and non-contiguous L-blocks (231 and 239) in the capacity (220) can be allocated to contiguous regions (245 and 247) of the namespace (223) via block-wise mapping.

When the block size (133) is reduced, the flexibility of the system in dynamic namespace management increases. However, a reduced block size (133) also increases the number of blocks to be mapped, which decreases the computation efficiency in address mapping. An optimal block size (133) balances the tradeoff between flexibility and efficiency; and a particular block size (133) can be selected for the specific usage of a given storage device (103) in a specific computing environment.

Figure 4:
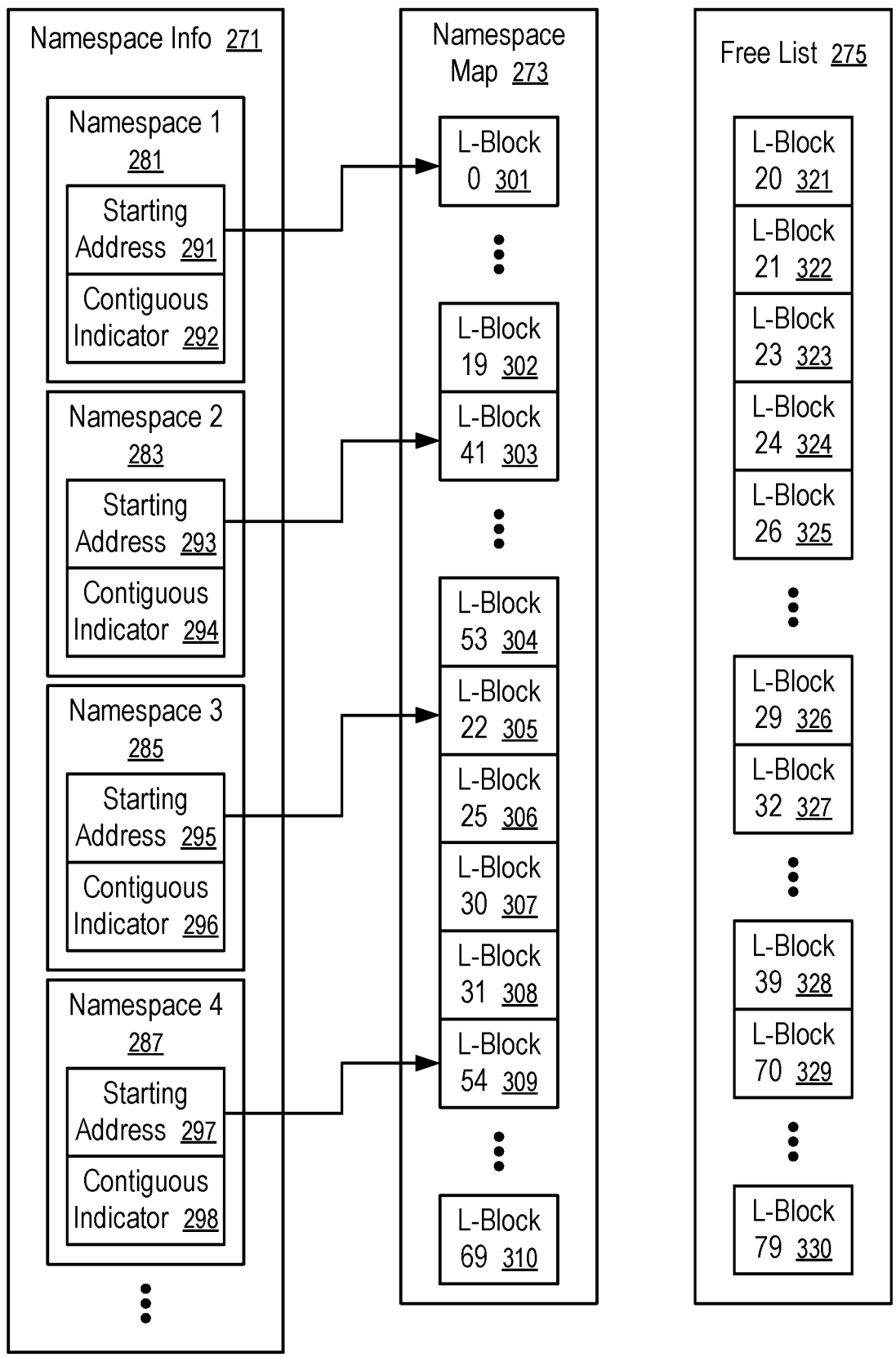
FIG. 4 illustrates an example of data structures for namespace mapping.

FIG. 4 illustrates an example of data structures for namespace mapping.

For example, the data structures for namespace mapping of FIG. 4 can be used to implement the block-wise address mapping illustrated in FIG. 3. The data structure of FIG. 4 is lean in memory footprint and optimal in computational efficiency.

In FIG. 4, a namespace map (273) stores an array of the identifications of L-blocks (e.g., 231, 233, ..., 237, 239) that have been allocated to a set of namespaces (e.g., 221, 223) identified in namespace info (271).

In the array of the namespace map (273), the identifications of L-blocks (301, ..., 302; 303, ..., 304; 305, ... 308; or 309, ..., 310) allocated for each namespace (281, 283, 285, or 287) are stored in a contiguous region of the array. Thus, the portions of identifications of L-blocks (301, ..., 302; 303, ..., 304; 305, ... 308; and 309, ..., 310) allocated for different namespaces (281, 283, 285, and 287) can be told apart from the identification of the starting addresses (291, 293, 295, and 297) of the block identifications in the array.

Optionally, for each of the namespaces (281, 283, 285, or 287), the namespace info (271) identifies whether or not the L-blocks (301, ..., 302; 303, ..., 304; 305, ... 308; or 309, ..., 310) allocated for the respective namespaces (281, 283, 285, or 287) is contiguous on the logical addresses in the capacity (220).

For example, when the capacity (220) is divided into 80 blocks, the L-blocks may be identified as L-blocks 0 through 79. Since contiguous blocks 0 through 19 (301 and 302) are allocated for namespace 1 (281), the contiguous indicator (292) of the namespace 1 (281) has a value indicating that the sequence of L-blocks, identified via the block identifiers starting at a starting address (291) in the array of the namespace map (273), occupy a contiguous region in the logical address space/capacity (220).

Similarly, L-blocks 41 through 53 (303 and 304) allocated for namespace 2 (283) are contiguous; and thus, a contiguous indicator (294) of the namespace 2 (283) has the value indicating that the list of L-blocks, identified via the block identifiers starting at a starting address (293) in the array of the namespace map (273), are in a contiguous region in the logical address space/capacity (220).

Similarly, L-blocks 54 through 69 (309 and 310) allocated for namespace 4 (287) are contiguous; and thus, a contiguous indicator (298) of the namespace 4 (287) has the value indicating that the list of blocks, identified via the block identifiers starting at a starting address (297) in the array of the namespace map (273) occupies a contiguous region in the logical address capacity (220). It is preferable, but not required, that the L-blocks allocated for a namespace are in a contiguous region in the mapped logical address space/capacity (220).

FIG. 4 illustrates that blocks 22, 25, 30 and 31 (305, 306, 307 and 308) allocated for namespace 3 (285) are non-contiguous; and a contiguous indicator (296) of the namespace 3 (285) has a value indicating that the list of blocks, identified via the block identifiers starting at a starting address (295) in the array of in the namespace map (273), is allocated from a non-contiguous regions in the mapped logical address space/capacity (220).

In some instances, a storage device (103) can allocate up to a predetermined number of namespaces. Null addresses can be used as starting addresses of namespaces that have not yet been allocated. Thus, the namespace info (271) has a predetermined data size that is a function of the predetermined number of namespaces allowed to be allocated on the storage device (103).

Optionally, the data structure includes a free list (275) that has an array storing the identifiers of L-blocks (321-325, ..., 326-327, ..., 328-329, ..., 330) that have not yet been allocated to any of the allocated namespaces (281, 283, 285, 287) identified in the namespace info (271).

In some instances, the list of identifiers of L-blocks (321-330) in the free list (275) is appended to the end of the list of identifiers of L-blocks (301-310) that are currently allocated to the namespaces (281, 283, 285, 287) identified in the namespace info (271). A free block starting address field can be added to the namespace info (271) to identify the beginning of the list of identifiers of the L-blocks (321-330) that are in the free list (275). Thus, the namespace map (273) has an array of a predetermined size corresponding to the total number of L-blocks on the capacity (220).

Figure 5:
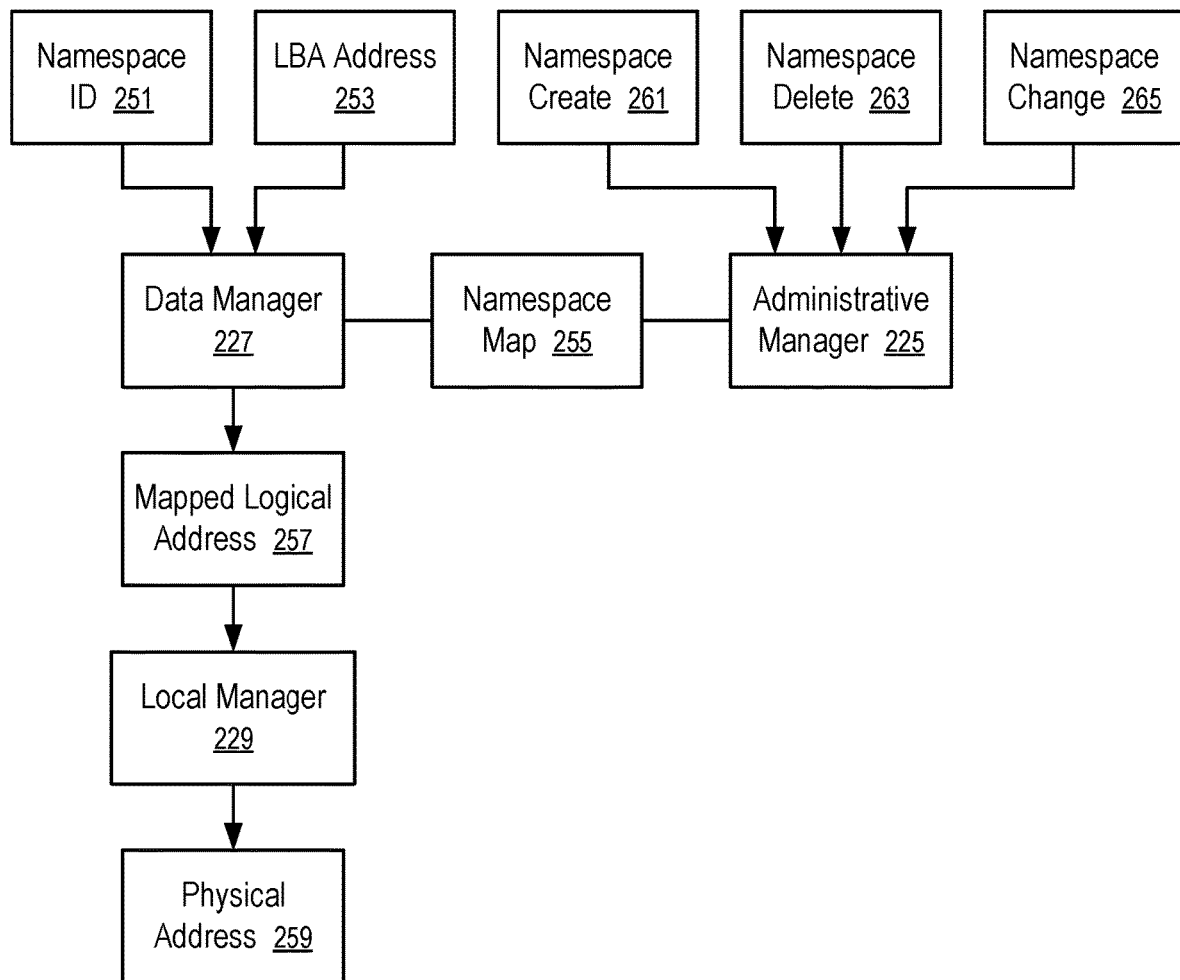
FIG. 5 shows a system to translate addresses in a non-volatile memory device to support namespace management.

FIG. 5 shows a system to translate addresses in a non-volatile memory device to support namespace management. For example, the system of FIG. 5 can be implemented using a storage device (103) illustrated in FIG. 1, a logical address mapping technique illustrated in FIG. 3, and a data structure similar to that illustrated in FIG. 4.

In FIG. 5, an administrative manager (225), a data manager (227) (or referred to as an I/O manager), and a local manager (229) are implemented as part of the firmware (e.g., 104) of a storage device (e.g., 103 illustrated in FIG. 1).

The administrative manager (225) receives commands (e.g., 261, 263, 265) from the host (e.g., 101 in FIG. 1) to create (261), delete (263), or change (265) a namespace (e.g., 221 or 223). In response, the administrative manager (225) generates/updates a namespace map (255), such as the namespace map (273) to implement the mapping illustrated in FIG. 2 or 9. A namespace (e.g., 221 or 223) may be changed to expand or shrink its size (e.g., by allocating more blocks for the namespace, or returning some of its blocks to the pool of free blocks).

The data manager (227) receives data access commands. A data access request (e.g., read, write) from the host (e.g., 101 in FIG. 1) identifies a namespace ID (251) and an LBA address (253) in the namespace ID (251) to read, write, or erase data from a memory unit identified by the namespace ID (251) and the LBA address (253). Using the namespace map (255), the data manager (227) converts the combination of the namespace ID (251) and the LBA address (253) to a mapped logical address (257) in the corresponding L-block (e.g., 231, 233, . . . , 237, 239).

The local manager (229) translates the mapped logical address (257) to a physical address (259). The logical addresses in the L-block (e.g., 231, 233, . . . , 237, 239) can be mapped to the physical addresses (259) in the storage media (e.g., 109 in FIG. 1), as if the mapped logical addresses (257) were virtually allocated to a virtual namespace that covers the entire non-volatile storage media (109).

Thus, the namespace map (255) can be seen to function as a block-wise map of logical addresses defined in a current set of namespaces (221, 223) created/allocated on the storage device (103) to the mapped logical addresses (257) defined on the virtual namespace. Since the virtual namespace does not change when the current allocation of the current set of namespaces (221, 223) changes, the details of the current namespaces (221, 223) are completely shielded from the local manager (229) in translating the mapped logical addresses (e.g., 257) to physical addresses (e.g., 259).

Preferably, the implementation of the namespace map (255) is lean in memory footprint and optimal in computational efficiency (e.g., using a data structure like the one illustrated in FIG. 4).

In some instances, the storage device (103) may not have a storage capacity (220) that is a multiple of a desirable block size (133). Further, a requested namespace size may not be a multiple of the desirable block size (133). The administrative manager (225) may detect the misalignment of the desirable block size (133) with the storage capacity (220) and/or the misalignment of a requested namespace size with the desirable block size (133), causing a user to adjust the desirable block size (133) and/or the requested namespace size. Alternatively or in combination, the administrative manager (225) may allocate a full block to a portion of a misaligned namespace and/or not use a remaining part of the allocated full block.

Figure 6:
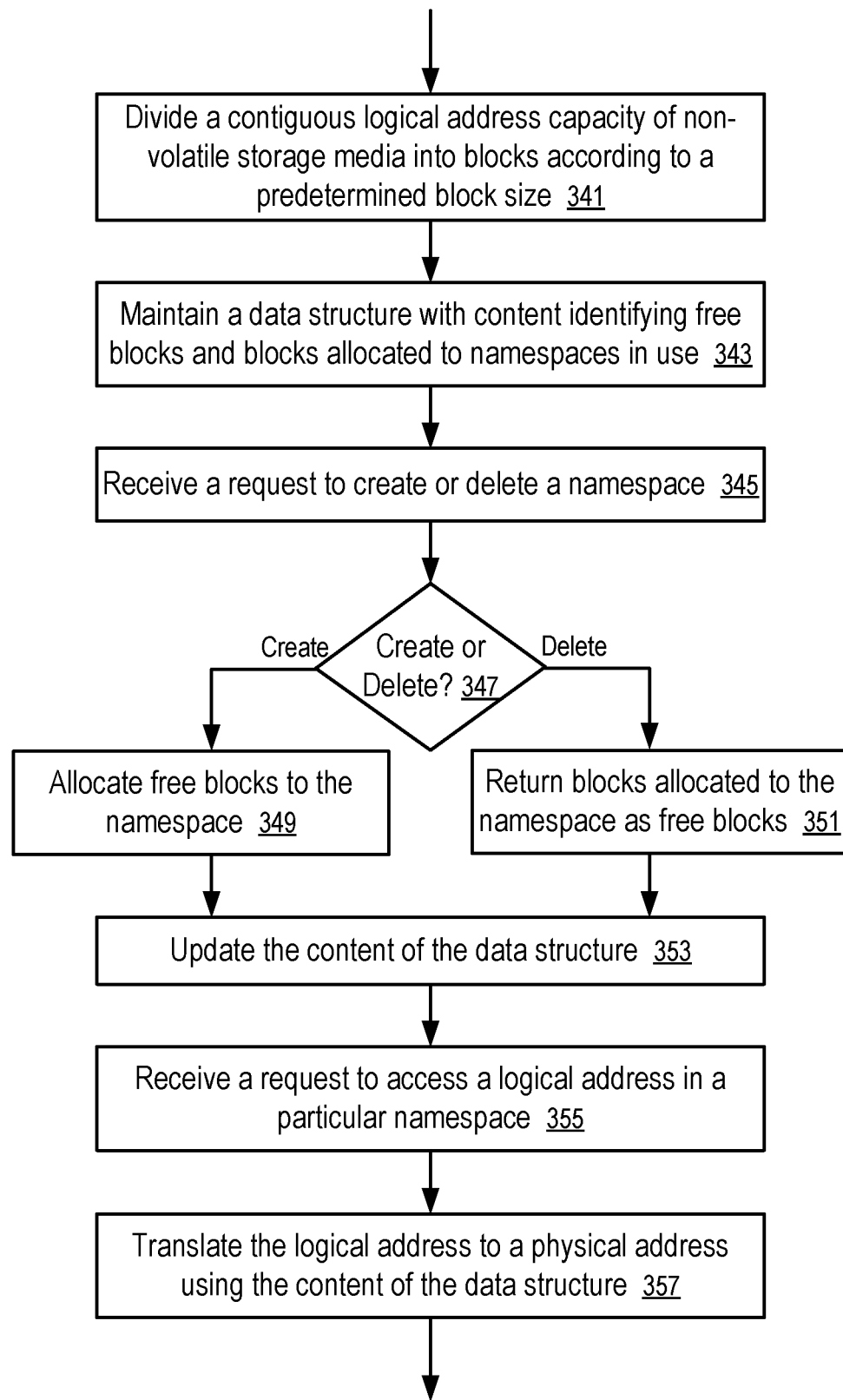
FIG. 6 shows a method to manage namespaces based on blocks of logical addresses.

FIG. 6 shows a method to manage namespaces based on blocks of logical addresses. For example, the method of FIG. 6 can be implemented in a storage device (103) illustrated in FIG. 1 using L-block techniques discussed above in connection with FIGS. 3-6.

In FIG. 6, the method includes: dividing (341) a contiguous logical address capacity (220) of non-volatile storage media (e.g., 109) into blocks (e.g., 231, 233, . . . , 237, 239) according to a predetermined block size (133) and maintaining (343) a data structure (e.g., illustrated in FIG. 4) with content identifying free blocks (e.g., 321-330) and blocks (e.g., 301-310) allocated to namespaces (281-285) in use.

In response to receiving (345) a request that is determined (347) to create a new namespace, the method further includes allocating (349) a number of free blocks to the namespace.

In response to receiving (345) a request that is determined (347) to delete an existing namespace, the method further includes returning (351) the blocks previously allocated to the namespace to the free block list (275) as free blocks.

In response to the request to create or delete a namespace, the method further includes updating (353) the content of the data structure to identify the currently available free blocks (e.g., 321-330) and blocks (e.g., 301-310) allocated to currently existing namespaces (281-285).

In response to receiving (355) a request to access a logical address in a particular namespace, the method further includes translating (357) the logical address to a physical address using the content of the data structure.

For example, a storage device (103) illustrated in FIG. 1 has: a host interface (105); a controller (107); non-volatile storage media (109); and firmware (104) containing instructions which, when executed by the controller (107), instruct the controller (107) to at least: store a block size (133) of logical addresses; divide a logical address capacity (220) of the non-volatile storage media (109) into L-blocks (e.g., 231, 233, . . . , 237, 239) according to the block size (133); and maintain a data structure to identify: a free subset of the L-blocks that are available for allocation to new namespaces (e.g., L-blocks 321-330); and an allocated subset of the L-blocks that have been allocated to existing namespaces (e.g., L-blocks 301-310). Preferably, the block size (133) is a power of two.

For example, the computer storage device (103) may be a solid state drive that communicates with the host (101) in accordance with a Non-Volatile Memory Host Controller Interface Specification (NVMHCI) for namespace management and/or access.

After the host interface (105) receives a request from a host (101) to allocate a particular namespace (221) of a quantity of non-volatile memory, the controller (107), executing the firmware (104), allocates a set of blocks (233 and 237) from the free subset to the particular namespace (221) and updates the content of the data structure. The set of blocks (233 and 237) allocated to the particular namespace (221) do not have to be contiguous in the logical address capacity (220), which improves the flexibility for dynamic namespace management.

Using the content of the data structure, the controller (107) executing the firmware (104) translates logical addresses defined in the first namespace the mapped logical addresses (257) and then to physical addresses (259) for the non-volatile storage media (109).

After the host interface (105) receives a request from the host (101) to delete (263) a particular namespace (221), the controller (107), executing the firmware (104), updates the content of the data structure to return the set of blocks (233 and 237) allocated to the particular namespace (221) from the allocated subset (e.g., 273) in the data structure to the free subset (e.g., 275) in the data structure.

Preferably, the data structure includes an array of identifications of blocks (301-310) in the allocated subset and pointers (291, 293, 295, 297) to portions (301-302, 303-304, 305-308, 309-310) of the array containing corresponding sets of identifications of blocks (301-310) that are allocated to respective ones of the existing namespaces (281, 283, 285, 287).

Optionally, the data structure further includes a set of indicators (292, 294, 296, 298) for the respective ones of the existing namespaces (281, 283, 285, 287), where each of the indicators (292, 294, 296, 298) indicating whether or not a respective set of identifications of blocks (301-302, 303-304, 305-308, 209-310) allocated to a corresponding one of the existing namespaces (281, 283, 285, 287) is contiguous in the logical address capacity (220) or space.

Optionally, the data structure includes an array of identifications of free blocks (321-330) in the free subset.

The logical address capacity (220) does not have to be a multiple of the block size (133). When the logical address capacity (220) is not a multiple of the block size (133), an L-block (e.g., 239) that is insufficient to be a full-size block may be not used.

The quantity of non-volatile memory requested for the creation (261) of a namespace (e.g., 221) does not have to be a multiple of the block size (133). When the quantity is not a multiple of the block size (133), one of the full blocks allocated to the namespace may not be fully utilized.

Figure 7:
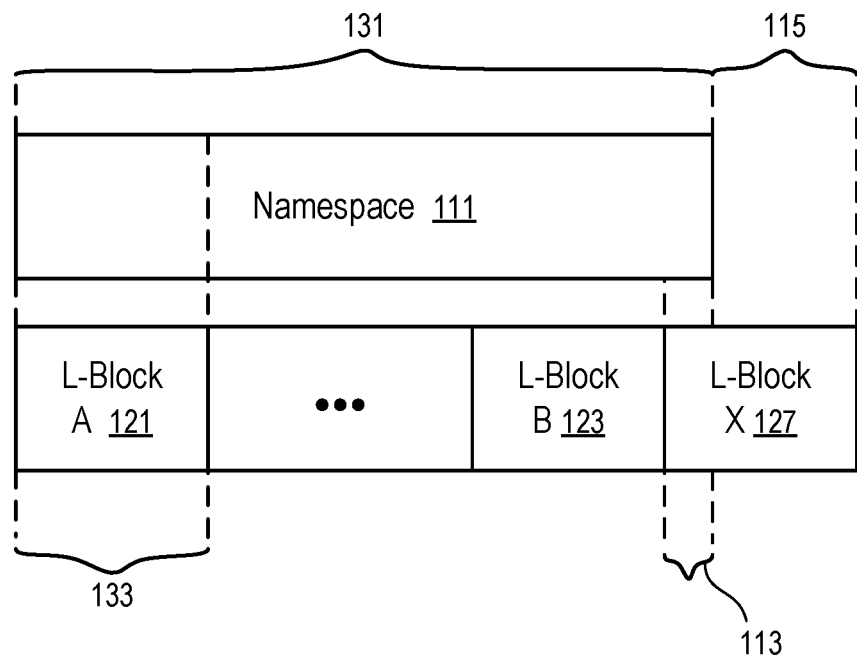
FIG. 7 shows an example diagram where a namespace is not aligned with block boundaries and can be implemented using the techniques of FIGS. 8-10.

FIG. 7 shows an example diagram where a namespace is not aligned with block boundaries and can be implemented using the techniques of FIGS. 8-11.

When a host (e.g., 101 in FIG. 1) requests the creation or reservation of a namespace (111) having a requested namespace size (131), a controller (e.g., 107 in FIG. 1) allocates a section of its non-volatile storage media (e.g., 109 in FIG. 1) to be addressed via LBA addresses under the namespace (111).

In a scenario illustrated in FIG. 7, the requested namespace size (131) is not the multiple of the block size (133). As a result, if the first LBA address in the namespace (111) representing a memory unit located in the namespace (111) is aligned with (e.g., mapped to) the first LBA address of an L-block (e.g., 121), the last LBA address in the namespace (111) cannot be aligned with (e.g., mapped to) the last LBA address of an L-block (e.g., 123), as illustrated in FIG. 7. Therefore, the namespace (111) is not aligned with boundaries of L-blocks for allocation. Since the requested namespace size (131) is not the multiple of the block size (133), the requested namespace size (131) is best satisfied by a number of full blocks (121, . . . , 123) and a portion (113) of a full block (127). The portion (113) is also referred to as a partial block (113).

In FIG. 7, the portion (113) of the full block (127) (or partial block (113)) is allocated for the namespace (111); and the remaining portion (115) of the full block (127) (or partial block (115)) is not allocated for the namespace (111). The remaining portion (115), or a portion of it, can be subsequently allocated to another namespace that also needs a partial block. Different namespaces may use different portions (e.g., 113, 115) of the full block (127).

Figure 8:
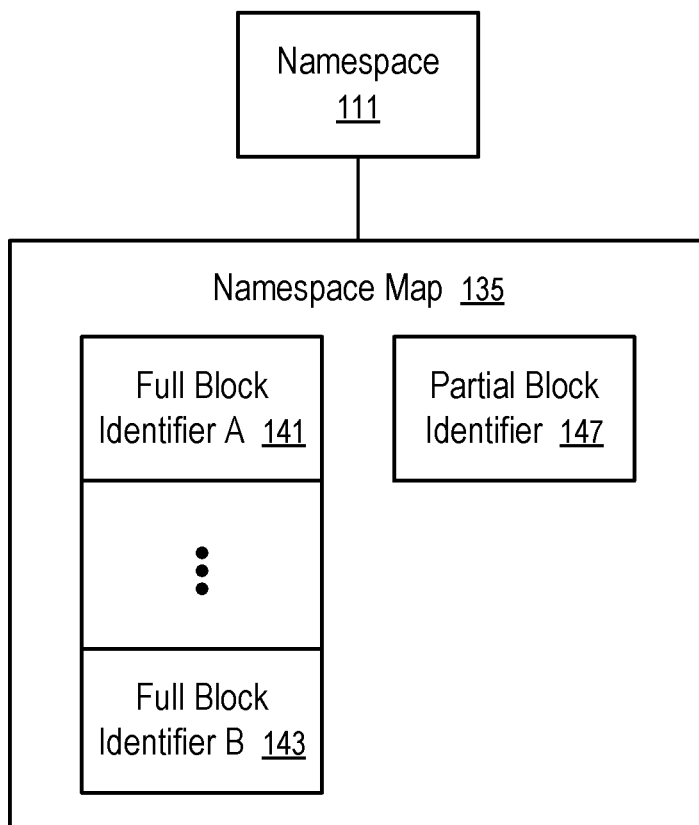
FIG. 8 illustrates an example block diagram of a namespace map to implement a namespace that is not aligned with block boundaries.

FIG. 8 illustrates an example block diagram of a namespace map to implement a namespace that is not aligned with block boundaries.

In FIG. 8, a namespace map (135) is linked to the namespace (111) to identify the blocks of LBA addresses allocated for the namespace (111). Any techniques for identification of the association of two items can be used to link the namespace map (135) to the namespace (111). For example, an identifier of the namespace map (135) can be stored in association with an identifier of the namespace (111) to link the namespace map (135) and the namespace (111). For example, a list of pointers corresponding to a list allocated namespaces can be used to identify the beginning memory locations of data structures of namespace maps to link the namespace maps with their namespaces. The addresses in the L-blocks (e.g., (121, . . . , 123)) can be further translated to the corresponding addresses of the physical storage locations by a separate layer of the firmware (104) (e.g., Flash Translation Layer (FTL) for solid state drives (SSDs)).

The namespace map (135) includes the identifiers (141, . . . , 143) of the full blocks (121, . . . , 123) allocated for the namespace (111) and an identifier (147) of a partial block (113) allocated for the namespace (111).

Since the full blocks (121, . . . , 123) have the same, predetermined block size (133), the list of full block identifiers (141, . . . , 143) can be identified using an array or list of the identifiers of starting units (or ending units) of the full blocks (121, . . . , 123). This arrangement simplifies the namespace map (135) and enables efficient address translation. However, the partial block (113) cannot be represented in such a way.

Figure 9:
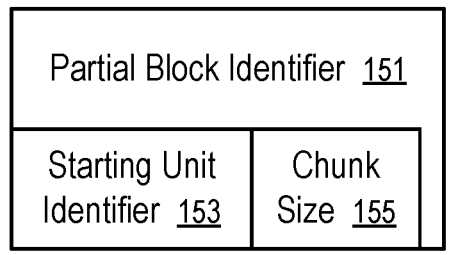
FIG. 9 illustrates an example partial block identifier that can be used to implement the namespace map of FIG. 8.

FIG. 9 illustrates an example partial block identifier that can be used to implement the namespace map of FIG. 8.

In FIG. 9, a partial block identifier (151) includes a starting unit identifier (153) and a chunk size (155). The starting unit identifier (153) is an identifier of the first logical memory unit in the partial block (e.g., 113 or 115) represented by the partial block identifier (151). When the partial block (113) is allocated on a chunk of memory units, the chunk size (155) represents the quantity of the memory units allocated to the partial block (113). Thus, the chunk size (155) can be added to the starting unit identifier (153) to compute the ending unit identifier, which is the last unit in the partial block (e.g., 113 or 115) represented by the partial block identifier (151). In combination, the partial block identifier (151) identifies a unique portion (e.g., 113 or 115) of a full block (e.g., 127). When the chunk size (155) is equal to the block size (133), the partial block identifier (151) actually represents a full block. So, a partial block identifier (151) can be used to represent a full block (which can be subsequently divided into multiple partial blocks (e.g., 113 or 115); and multiple contiguous partial blocks (e.g., 113 or 115) can be combined into a full block (e.g., 127)).

For example, the partial block identifier (151), having the corresponding data specifying the starting unit identifier (153) and the chunk size (155) for the partial block (113), can be used as the partial block identifier (147) in the namespace map (135) of FIG. 8 to represent the partial block (113) in FIG. 7 allocated for the namespace (111).

For example, the partial block identifier (151), having the corresponding data specifying the starting unit identifier (153) and the chunk size (155) for the partial block (115), can be used to represent the unallocated partial block (115) in FIG. 7 that is free and available for allocation to another namespace. A linked list of unallocated partial blocks (e.g., 115) can be used to track a pool of free partial blocks.

Alternatively, the chunk size (155) in the partial block identifier (151) can be replaced with the ending unit identifier of the corresponding partial block. The partial block identifier (151) can also be equivalently represented by a combination of the chunk size (155) and the ending unit identifier.

Figure 10:
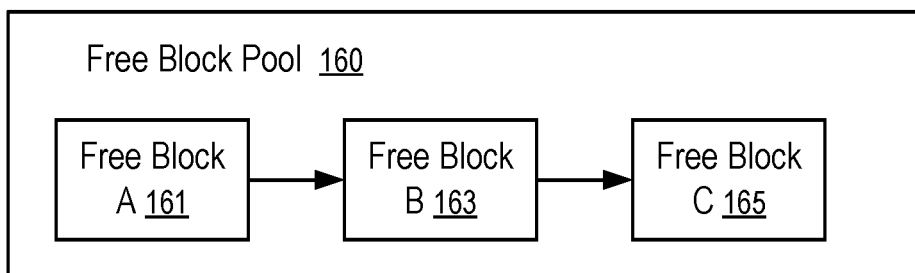
FIG. 10 illustrates an example data structure to manage a pool of free blocks available for namespace allocation using the technique of FIG. 8.

The controller (107), programmed by the firmware (104), stores data (e.g., in volatile DRAM (106) and/or non-volatile storage media (109)) to track a pool of free blocks using a linked list of partial blocks as illustrated in FIG. 10.

Preferably, each namespace map (135) uses no more than one partial block (113) for efficient address translation. However, in some instances, a namespace map (e.g., 135) may include multiple partial blocks (e.g., 113) when there is not a single free partial block (e.g., 113) to satisfy the request.

FIG. 10 illustrates an example data structure to manage a pool of free blocks available for namespace allocation using the technique of FIG. 8.

A data structure of a free block pool (160) includes identifiers of free blocks (161, 163, . . . , 165).

In one implementation, the free block pool (160) is used to track the available free partial blocks (e.g., 115) that can be allocated to new namespaces. Each of the free blocks (161, 163, . . . , 165) can be identified using the partial block identifier (151) illustrated in and/or discussed in connection with FIG. 9.

In some implementations, the free block pool (160) also optionally tracks the available free full blocks (161, 163, . . . , 165), where each of the full blocks are conveniently represented using the data structure of the partial block identifier (151) illustrated in FIG. 9, with the chunk size (155) being equal to the block size (133).

In other implementations, the free block pool (160) tracks the available free full blocks (161, 163, . . . , 165), using a list of full block identifiers in a way similar to the list of full block identifiers used in the namespace map (135), where each of the full block identifiers is presented by a representative unit identifier (e.g., a starting unit, or an ending unit), in view of the known, uniform block size (133) of the full blocks.

Figure 11:
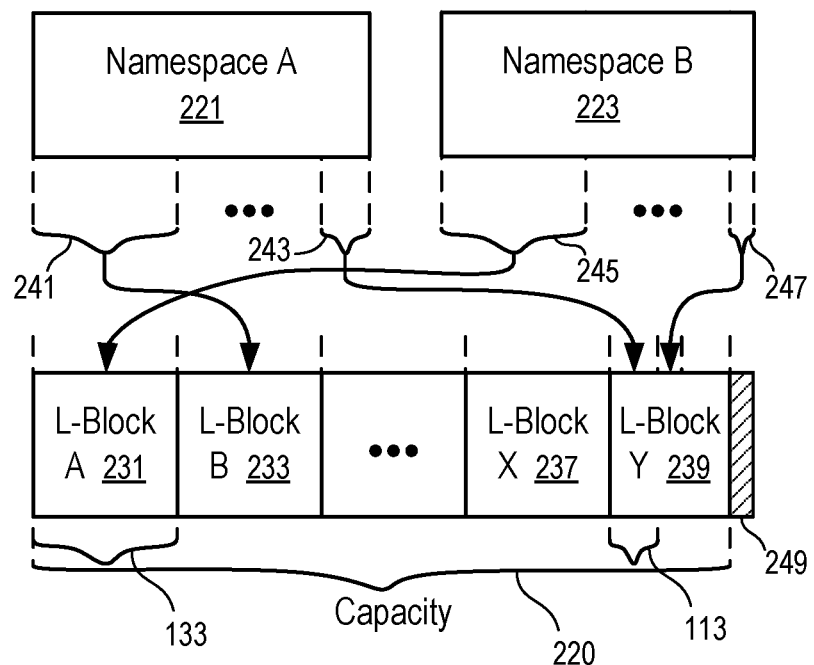
FIG. 11 illustrates an example of allocating namespaces using partial blocks.

The administrative manager (225) may use the partial block identification techniques discussed above in connection with FIGS. 7-10 to efficiently handle the mismatch of the requested namespace size (131) and/or the capacity (220) with the block size (133), with increased flexibility and minimum impact on address translation performance, as illustrated in FIG. 11.

FIG. 11 illustrates an example of allocating namespaces using partial blocks.

For example, the technique of FIG. 11 can be used to facilitate dynamic namespace management on the storage device (103) illustrated in FIG. 1 using the partial block identification techniques of FIGS. 8-10.

In FIG. 11, the storage capacity (220) of the non-volatile storage media (109) is divided into blocks of LBA addresses (L-blocks) (231, 233, . . . , 237) of the same size (e.g., 133 illustrated in FIG. 7), except that the last block (239) has a size smaller than the predetermined block size (133). In FIG. 11, the administrative manager (225) may virtually expand the last block (239) to include a virtual capacity (249) such that the last block (239) may also be viewed to have the same size (133). However, since the virtual capacity (249) is not available for allocation to any namespace, the administrative manager (225) puts the free portion of the last block (239) in a free block pool (160) as an available partial block (e.g., represented by a partial block identifier (151) of FIG. 9), as if the portion of the virtual capacity (249) had already been allocated to an existing namespace.

Preferably, the block size (133) is a power of two, which is advantageous in optimizing the computations involving the block size (133). For example, when the block size (133) is a power of two, operations of division, modulo, and/or multiplication involving the block size (133) can be simplified via shift operations.

The logical addresses in the L-blocks (231, 233, . . . , 237, 239) can be translated into physical addresses of the non-volatile storage media (109) independent from the allocation of namespaces (e.g., 221, 223) (e.g., by a flash translation layer of the firmware (104) of the storage device (103) configured as a solid state drive (SSD)).

Dividing the storage capacity (220) into the (L-blocks) (231, 233, . . . , 237), with a possible partial block (239), allows the dynamic management of namespaces at the block level. The logical addresses defined in the namespaces (e.g., 221, 223) are mapped to the L-blocks (231, 233, 237, 239) defined on the capacity (220) such that the namespace implementation details are shielded from the translation from the mapped logical address (257) in the L-blocks (231, 233, 237, 239) to the physical addresses (259) of the non-volatile storage media (109).

For example, a full size block (241) of logical addresses in namespace A (221) is linearly mapped into the mapped logical addresses (257) in one L-block (233). Similarly, a full size block (245) of logical addresses in namespace B (221) is linearly mapped into the mapped logical addresses (257) in another L-block (231). The block-wise mapping of logical addresses improves efficiency in the address translation.

When the sizes of the namespaces (221, 223) are not multiples of the block size (133), portions (243, 247) of the namespaces (221, 223) can be mapped to partial blocks of one or more full size blocks (e.g., 237) in a way as illustrated in FIGS. 7-11. The data structure of FIG. 4 can be modified to include a partial block identifier (147) of a partial L-block (113) allocated to a namespace (221) that has a last portion (e.g., 243) that is smaller than the predetermined block size (133), and to include a list of free partial blocks.

By maintaining a namespace map (e.g., 135 illustrated in FIG. 8, 273 illustrated in FIG. 4, which may be further modified to include partial block identifiers) and a free block pool (e.g., 160 illustrated in FIG. 10, 275 illustrated in FIG. 4, which may be further modified to include partial block identifiers), the controller (107) of the storage device (103) allows dynamic management of namespaces, where namespaces may be created/allocated when needed, deleted when no longer used, and/or resized, with fragmentation impact being reduced or eliminated. The mapping from the logical addresses in the namespace (e.g., 221, 223) to the logical addresses for translation to physical addresses can be dynamically adjusted in response to the commands from the host (101) to create/allocate, delete, and/or resize namespaces (e.g., shrink or expand).

Optionally, when the host (101) requests a namespace (e.g., 111, 221, or 223) that has a size not aligned with a block boundary, the host (101) may be prompted to revise the size of the namespace (e.g., 111, 221, or 223) for alignment with a block boundary.

Figure 12:
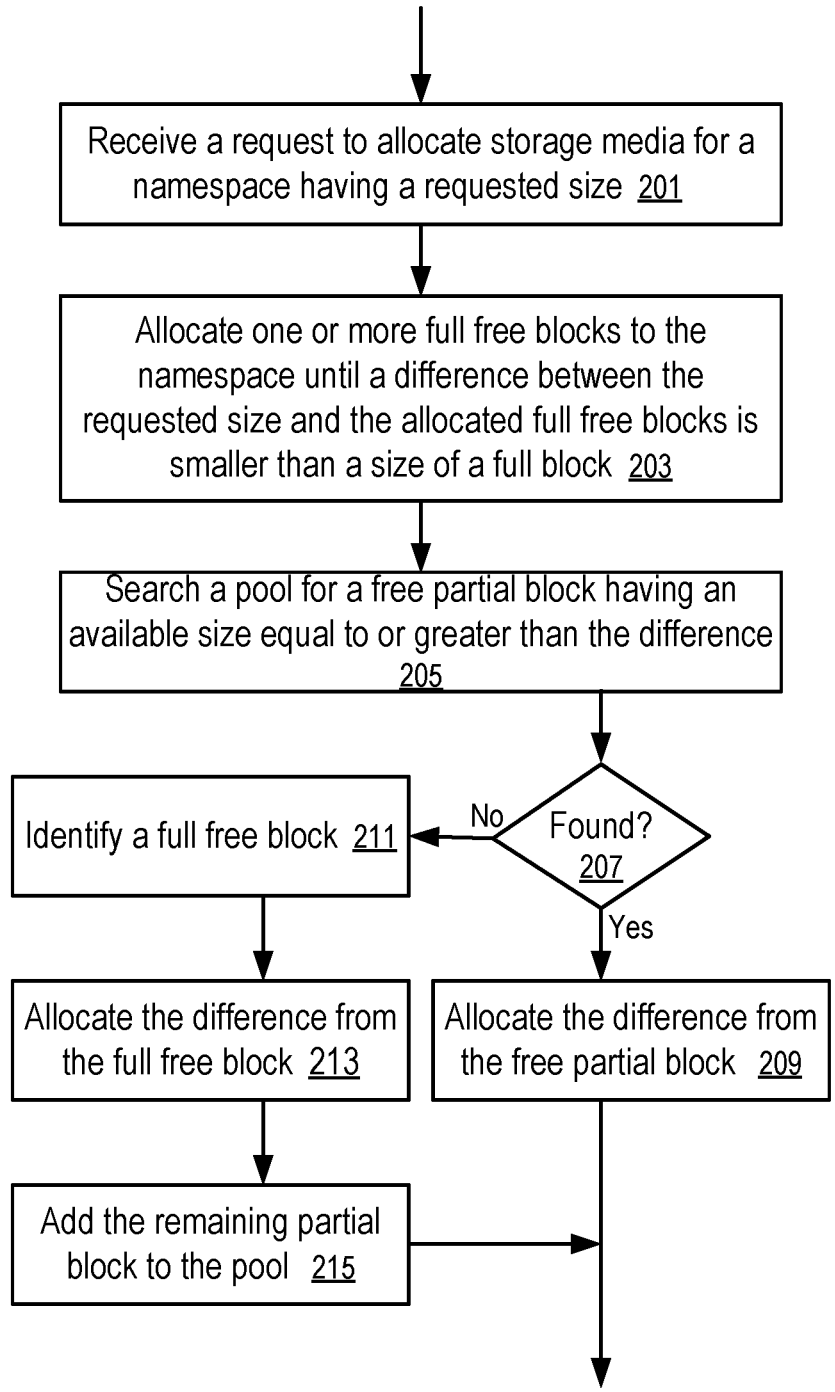
FIG. 12 shows a method to allocate a namespace on a storage device according to one embodiment.

FIG. 12 shows a method to allocate a namespace on a storage device according to one embodiment.

For example, the method of FIG. 12 can be implemented via executing the firmware (104) by the controller (107) of the storage device (103).

The method includes receiving (201) a request to allocate a portion of the non-volatile storage media (109) of the storage device (103) for a namespace (111) having a requested namespace size (131), which may or may not be a multiple of the size (133) of full L-blocks on the storage device (103).

In response to the request, the method further includes allocating (203) one or more full free L-blocks (121, . . . , and/or 123) to the namespace (111) until a difference between the requested namespace size (131) and the allocated one or more full free L-blocks (121, . . . , and/or 123) is smaller than the size (133) of a full L-block (e.g., 121, . . . , 123, or 127).

When the difference is smaller than the full block size (133), the method further includes searching (205) a free block pool (160) for one or more free partial blocks (161, 163, 165) having a total available size equal to or greater than the difference (113). Preferably, no more than one partial block is used for the difference.

If one or more free partial blocks (e.g., 161) that have a total size of available storage capacity equal to or greater than the difference (113) are found (207), the method further includes allocating (209) the difference (113) from the one or more free partial blocks (e.g., 161). If the available storage capacity is larger than the difference (113), the remaining unallocated one or more partial blocks are free and remain in the pool (160). If the available storage capacity is equal to the difference, the entirety of the one or more free partial blocks (e.g., 161) is allocated to the namespace (111) and thus removed from the free block pool (160).

If one or more free partial blocks having a total size of available storage capacity equal to or greater than the difference are not found (207), the method further includes: identifying (211) a full free block (e.g., 127); allocating (213) the difference (113) from the identified full free block (e.g., 127); and adding (215) the remaining partial block (115) of the identified full free block to the pool (160).

In some implementations, when there is no available full free block to successfully carry out the operation of identifying (211) a full free block for the difference, the method may report an error or warning, and/or attempt to use more than one free partial block (e.g., 161 and 163) to meet the difference.

When the namespace (111) is deleted, the partial block (113) allocated for the namespace (111) is freed and added to the free block pool (160); and full blocks (121, . . . , 123) allocated for the namespace (111) are also freed and become available for allocation to other namespaces. A routine of the firmware (104) detects and combines contiguous free partial blocks (e.g., 113 and 115) to reduce the numbers of partial free blocks in the pool (160). When partial free blocks (e.g., 113 and 115) in the pool (160) are combined into a full free block (127), the partial free blocks (e.g., 113 and 115) are converted into a free block representation (e.g., represented by the identification of a representative unit, such as a starting or ending unit).

For example, a computer storage device (103) of one embodiment includes: a host interface (105); a controller (107); and non-volatile storage media (109). The computer storage device (103) has firmware (104) containing instructions, which when executed by the controller (107), instruct the controller (107) to at least: receive, via the host interface (105), a request from a host (101) to allocate a namespace (111) of a requested namespace size (131) of non-volatile memory; generate, in response to the request, a namespace map (135) that identifies a plurality of L-blocks (121, . . . , 123), each having the same predetermined block size (133), and a partial L-block (113) having a size smaller than the predetermined block size (133); and convert, using the namespace map (135), logical addresses in the namespace (111) communicated from the host (101) to physical addresses (259) for the quantity of the non-volatile memory.

For example, the request to allocate the namespace (111) can be made using a protocol that is in accordance with Non-Volatile Memory Host Controller Interface Specification (NVMHCI) or NVMe.

For example, the computer storage device (103) can be a solid state drive (SSD).

For example, a method implemented in the computer storage device (103) includes receiving, in the controller (107) coupled with a non-volatile storage media (e.g., 109), a request from a host (101) to create or reserve a namespace (111) of a requested namespace size (131) of non-volatile memory from the non-volatile storage media (e.g., 109) of the computer storage device (103) (e.g., in accordance with NVMe). In response to the request, the method further includes generating, by the controller (107), a namespace map (135) that identifies: a plurality of L-blocks (121, . . . , 123) having a same predetermined block size (133), and a partial L-block (113) having a size smaller than the predetermined block size (133). The L-blocks (121, . . . , 123, 113) are further translated to specific portions of the non-volatile storage media (e.g., 109) (e.g., via a translation layer). After the namespace map (135) is generated for the namespace (111), the method further includes converting, by the controller (107) using the namespace map (135), logical addresses in the namespace (111) communicated from the host (101) to physical addresses for the quantity of the non-volatile memory.

Preferably, each of the plurality of L-blocks (121, . . . , 123) is represented in the namespace map (135) using a full block identifier (e.g., 141, . . . , or 143) that includes no more than an identification of a representative unit (e.g., a starting unit or an ending unit), in view of the known, uniform block size (133) of full blocks (121, . . . , 123, 127). Optionally, a full block identifier (e.g., 141, . . . , or 143) may include an indication of the block size (133) (e.g., by including both the identification of the starting unit, and the identification of the ending unit).

Preferably, the partial L-block (113) is represented in the namespace map (135) using an identifier (153) of a starting unit allocated for the namespace (111) and a chunk size (155). The starting unit is not necessarily the first unit in the full L-block (127) from which the partial block (113) is allocated. For example, when a subsequent namespace needs a partial block that has a size smaller than or equal to the remaining block (115), the partial block allocated for the subsequent namespace can have a starting unit that follows the ending unit of the partial block (113) in the L-block (127).

Alternatively, the partial L-block (113) can be represented in the namespace map (135) by an identification of an ending unit allocated for the namespace (111) (or another representative unit) and a chunk size (155).

Optionally, the method further includes maintaining, in the computer storage device (103), a free block pool (160) that identifies any partial L-block(s) (e.g., 127) available for allocation to another namespace.

Preferably, the computer storage device (103) stores a copy of the namespace map (135) and the free block pool (160) in the non-volatile storage media (e.g., 109) of the storage device (103) for persistent storage and uses a copy of the namespace map (135) and the free block pool (160) in the volatile DRAM (106) for computation.

As an example, generating the namespace map (135) can be performed via: allocating the plurality of L-blocks (121, . . . , 123) for the namespace (111) such that the size difference between the requested namespace size (131) of the namespace (111) and the plurality of L-blocks (121, . . . , 123) is smaller than the block size (133). After the determination of the difference between the quantity (133) of non-volatile memory requested for the namespace (111) and the total size of the plurality of full L-blocks (121, . . . , 123), the method further includes searching in the free block pool (160) for a partial L-block that is equal to or larger than the difference.

If a first partial L-block (e.g., 161), having a size larger than the difference, is found in the free block pool (160), the method further includes: allocating a portion of the first partial L-block (e.g., 161) for the namespace (111) (e.g., by creating a partial block identifier (147) for the namespace map (135)); and updating the first partial L-block (161) in the free block pool (160) to represent a remaining portion of first partial L-block (e.g., 161) that is not allocated for the namespace (111) and is free for allocation to another namespace.

If a first partial L-block (e.g., 161) having a size equal to the difference is found in the free block pool (160), the method further includes: removing the first partial L-block (e.g., 161) from the free block pool (160); and allocating the first partial L-block (e.g., 161) for the namespace (111).

If no partial L-block having a size equal to or larger than the difference is found in the free block pool (160), a full size free block (e.g., 127) may be allocated for the pool (160) and temporarily treated as a partial free block (e.g., 161). For example, the method further includes: adding a first L-block (e.g., 127) having the same predetermined block size (133) to the free block pool (160) (e.g., as the free block (161)); allocating a portion (113) of the first L-block for the namespace (111); and updating the first L-block (161) in the free block pool (160) to represent a remaining portion (115) of the first L-block (e.g., 127) that is not allocated for the namespace (111) and is free for allocation to another namespace.

Optionally, the method further includes receiving, in the controller (107), a request from the host (105) to delete the namespace (111), and adding, to the free block pool (160) by the controller (107) in response to the request, the partial L-block (113), identified by the partial block identifier (147) in the namespace map (135) of the namespace (111).

When the free block pool (160) has more than one partial free block (e.g., 113 and 115), the method optionally further includes: identifying, in the free block pool (160), contiguous free partial blocks (e.g., 113 and 115); and combining, in the free block pool (160), the contiguous free partial blocks (e.g., 113 and 115) into a single free partial block.

Optionally, the method further includes: after combining free partial blocks (e.g., 113 and 115) in the free block pool (160), determining whether a combined free partial block (e.g., 127) is a full free block that has the predetermined block size (133); and in response to a determination that the combined free partial block (e.g., 127) has the predetermined block size (133), removing the combined free partial block (e.g., 127) from the free block pool (160), such that the free block pool (160) contains only the identifications of partial free blocks; and free full blocks can be more efficiently represented by a list of full block identifiers, where each block in the free block pool (160) is represented by a partial block identifier having an identification of an unit in the block and a chunk size.

The techniques of allocating a namespace through namespace mapping of full and/or partial L-blocks, discussed above in connection with FIGS. 1-12, can be used to implement dynamic adjustment of namespace sizes, including namespace expansion, namespace reduction, and thin provisioning of namespaces, as further discussed below.

FIGS. 13-16 illustrate examples of adjusting sizes of namespaces through namespace mapping.

A namespace can be adjusted in size to add or remove an L-block of the predetermined block size (133).

Figure 13:
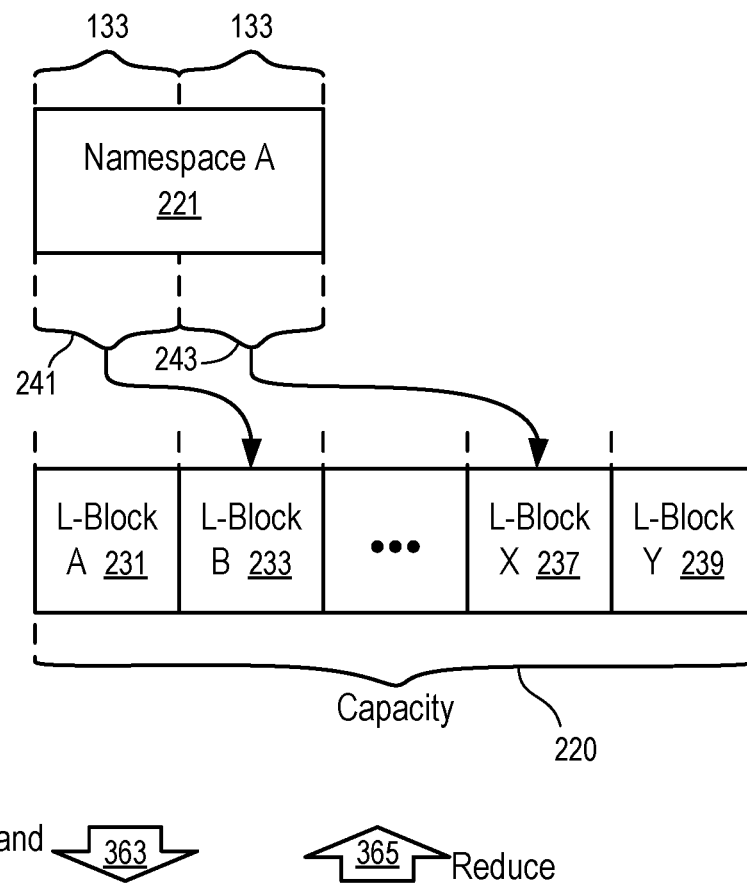
FIGS. 13-16 illustrate examples of adjusting sizes of namespaces through namespace mapping.
Figure 13:
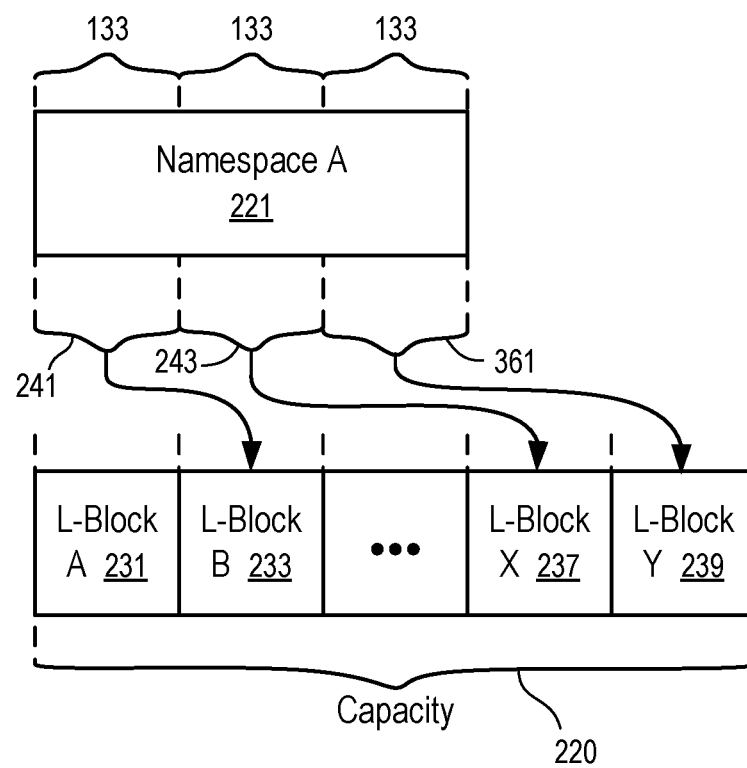

For example, FIG. 13 shows a name space (221) having blocks (241, 243) being mapped to L-blocks (233, 237) before being expanded (363) to have blocks (241, 243, 361) that are mapped to L-blocks (233, 237, 239) respectively.

To expand the namespace (221) by a block (361) having the predetermined block size (133), the namespace map (e.g., 273) of the namespace (221) is updated to include the identification of the L-block (239) that is allocated as the expanded capacity of the namespace (221).

For example, to expand the namespace (221) by a block (361), the controller (107) executing the firmware (104) identifies a free L-block (239) (e.g., from a free block pool (160) or the free list (275)) that has not yet been allocated to an existing namespace, and allocates the L-block (239) to the namespace (221) by including an identification of the L-block (239) in the namespace map (e.g., 135 or 273) of the namespace (221) and removing the identification of the L-block (239) from the free block pool and list (160 or 275).

In the reverse direction, FIG. 13 also shows a name space (221) having blocks (241, 243, 361) that are mapped to L-blocks (233, 237, 239) respectively before being reduced (365) to have blocks (241, 243) that are mapped to L-blocks (233, 237) respectively.

To shrink the namespace (221) by a block (361) having the predetermined block size (133), the namespace map (e.g., 273) of the namespace (221) is updated to remove the identification of the L-block (239) that corresponds to the removed capacity of the namespace (221).

For example, to shrink the namespace (221) by a block (361), the controller (107) executing the firmware (104) identifies the L-block (239) mapped to the last block (361) of the namespace (221) in the namespace map (e.g., 135 or 273) of the namespace (221), removes the identification of the L-block (239) from the namespace map (e.g., 135 or 273) of the namespace (221), and adds the identification of the L-block (239) to a free block list (e.g., a free block pool (160) or the free list (275)) such that the L-block (239) may be subsequently allocated to another namespace (or the namespace (221) when needed or requested).

Figure 14:
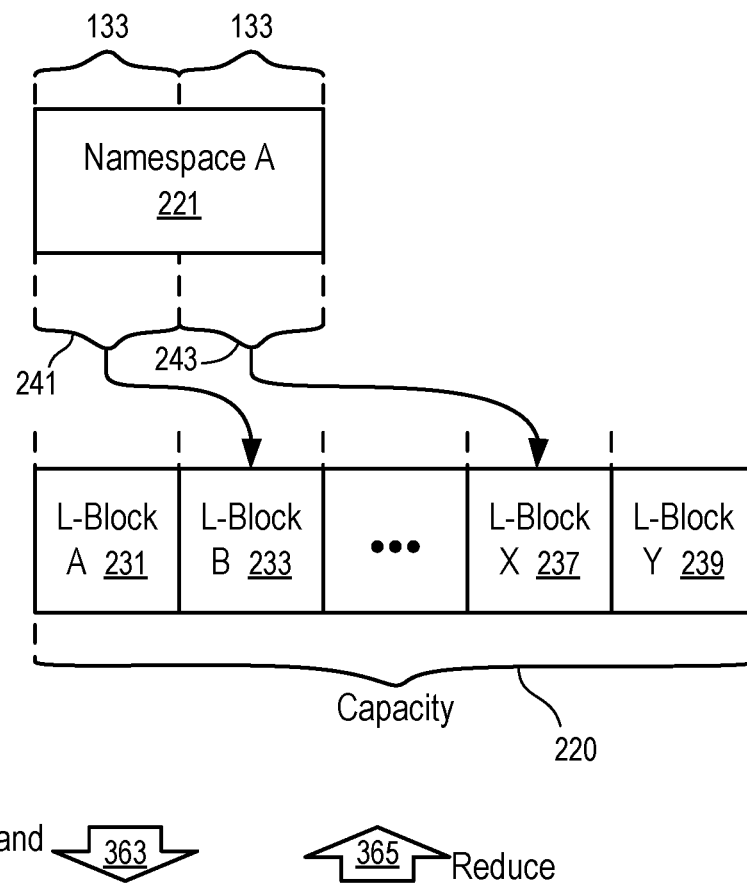
Figure 14:
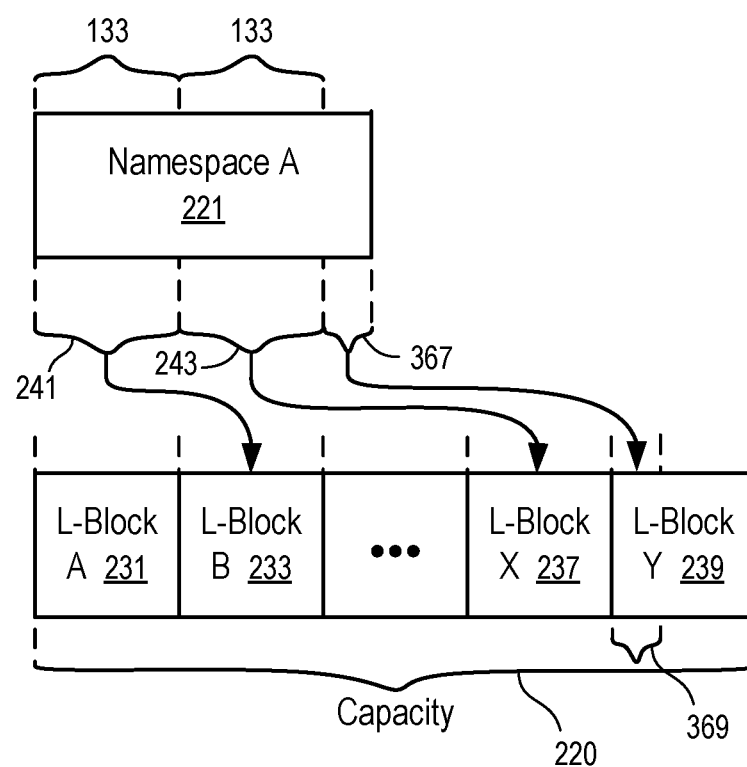

FIG. 14 illustrates an example of expanding a namespace by a partial L-block and/or reducing a namespace by a partial L-block.

For example, a name space (221) having blocks (241, 243) being mapped to L-blocks (233, 237) in FIG. 14 is expanded (363) to have full blocks (241, 243) and a partial block (367) that are mapped to L-blocks (233, 237) and a partial L-block (239) respectively.

To expand the namespace (221) by an added capacity of a partial block (367) smaller than the predetermined block size (133), the namespace map (e.g., 135 or 273) of the namespace (221) is updated to include the identifier of the partial L-block (369) that is allocated from a full block (239), as the expanded capacity of the namespace (221).

For example, to add the capacity of a partial block (367) to the namespace (221), the controller (107) executing the firmware (104) identifies a free partial L-block (369) having the corresponding size (e.g., allocated from a free full block or a free partial block from a free block pool (160) or the free list (275)), and adds the identification (e.g., using an identifier illustrated in FIG. 4) of the partial L-block (239) to the namespace (221) (e.g., as illustrated in FIG. 3).

Preferably, the namespace (221) is mapped to no more than one partial L-block (239). Preferably, the full-size L-blocks (231, 233, . . . , 237) of the namespace (221) are contiguous in the capacity (220). A remapping technique (e.g., as discussed in connection with FIG. 17) can be used to optimize the namespace mapping by consolidating partial and full-size L-blocks so that the full-size L-blocks (231, 233, . . . , 237) of the namespace (221) are contiguous in the capacity (220) and the namespace (221) has no more than one partial L-block (239).

In a reverse direction, a name space (221) having full blocks (241, 243) and a partial block (367) that are mapped to full L-blocks (233, 237) and a partial L-block (369) can be reduced (365) to have blocks (241, 243) that are mapped to full L-blocks (233, 237) respectively.

To shrink the namespace (221) by removing the capacity of a partial block (367), the namespace map (e.g., 273) of the namespace is updated to remove the partial block identifier (147) of the L-block (369) that corresponds to the removed capacity of the namespace (221). The removed L-block (369) is returned to the free block pool (160) where it can be combined with other free partial block(s) to form a free full L-block (239).

Figure 15:
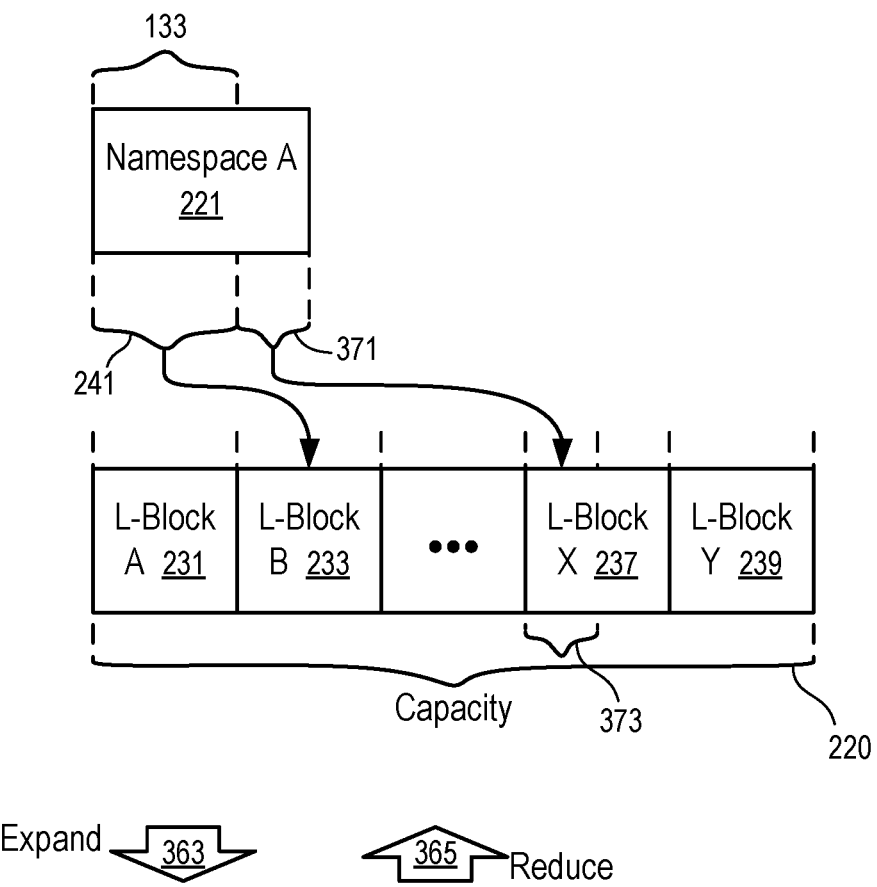
Figure 15:
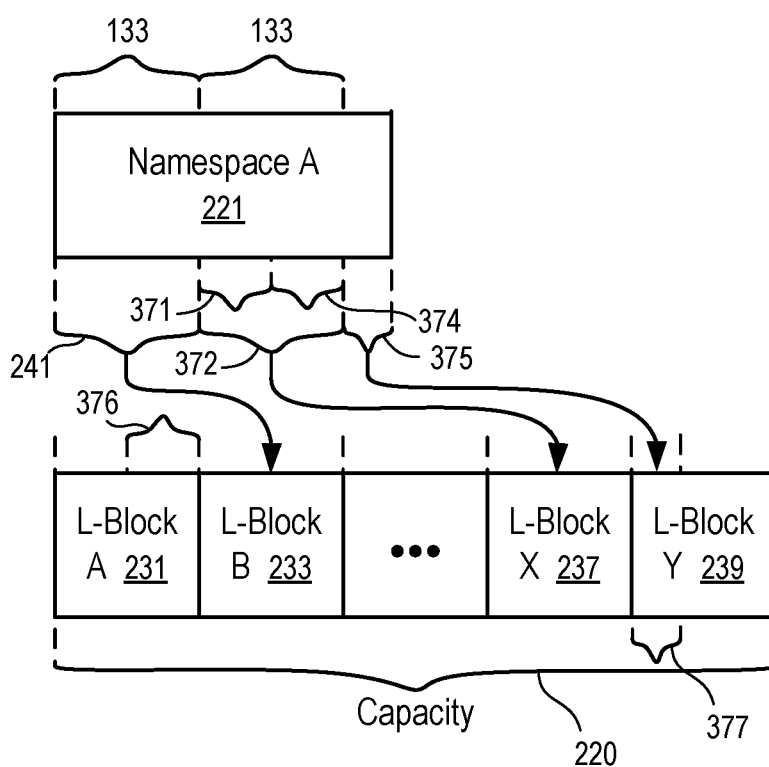

FIG. 15 illustrates an example in which the namespace (221) has a partial block (371/375) before and after the size change.

For example, a namespace (221) having a full block (241) and a partial block (371) that are mapped to a full L-block (233) and a partial L-block (373) in FIG. 15 can be expanded (363) to have full blocks (241, 372), and a partial block (375) that are mapped to full L-blocks (233, 237) and a partial L-block (377) respectively.

In FIG. 15, the L-block (237) from which the partial L-block (373) is allocated has a free capacity that allows the partial L-block (373) to be expanded to the full L-block (237) to accommodate the expanded capacity (372).

Figure 17:
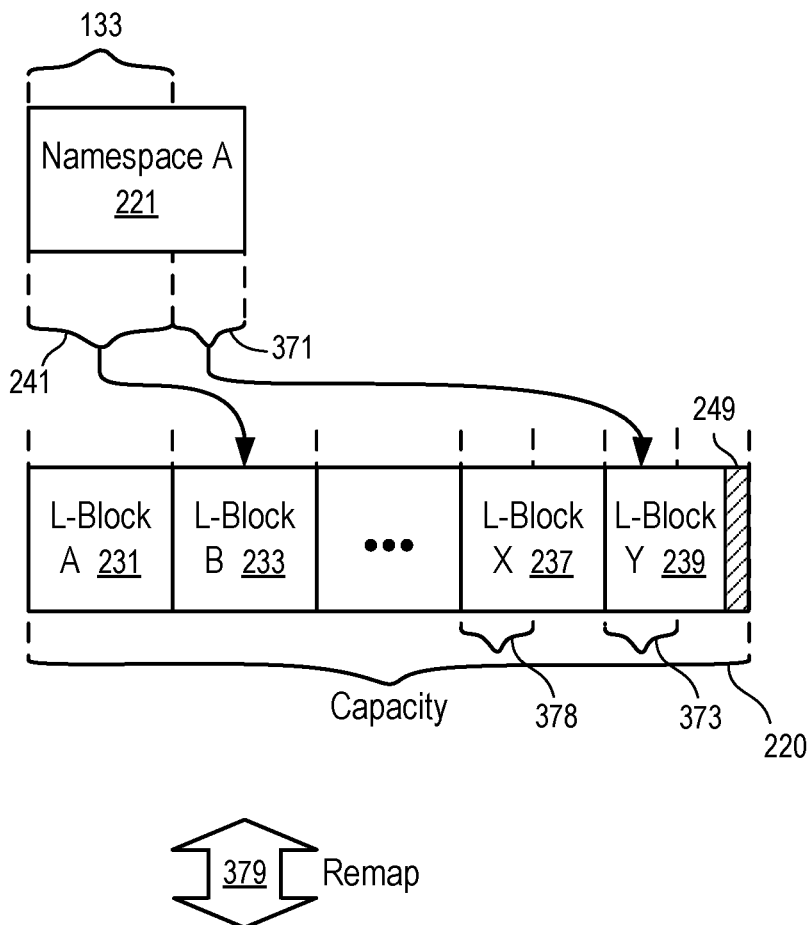
FIG. 17 illustrates remapping of a namespace.
Figure 17:
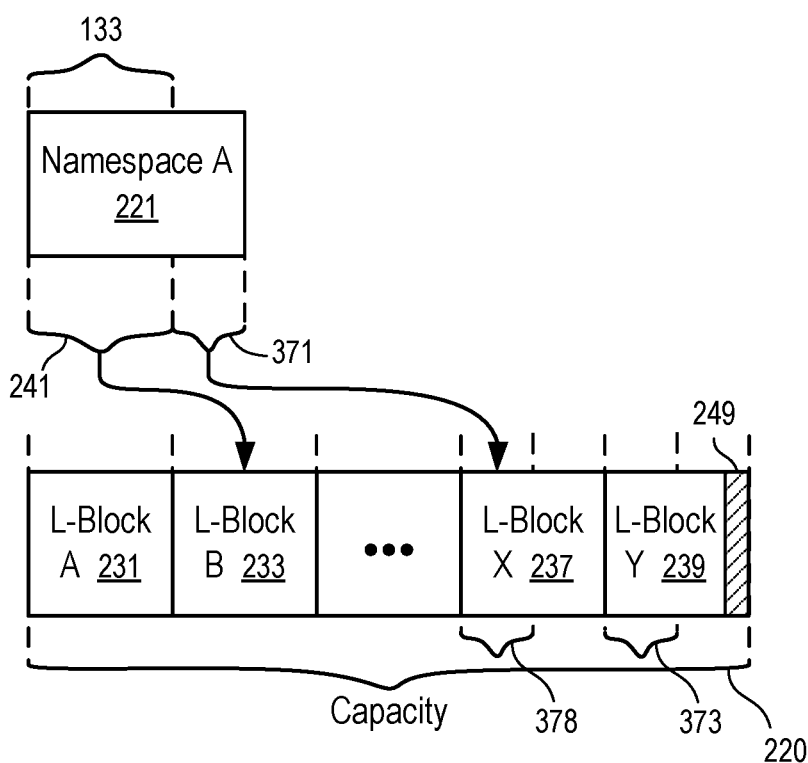

In other instances, when the L-block (237) from which the partial L-block (373) is allocated does not have a free capacity that allows the partial L-block (373) to be expanded to the full L-block (237) (e.g., when another portion of the L-block (237) is currently allocated to another namespace, similar to the situation where the block (239) in FIG. 11 has multiple portions allocated to different namespaces (221 and 223)), the initial partial block (371) can be remapped to another L-block (e.g., 231) (e.g., as illustrated in FIG. 17) to allow its expansion to a full L-block (e.g., 231).

Alternatively, one or more partial L-blocks (e.g., 371, 374) are allocated for the expanded block (372), which can be subsequently combined into a full block via remapping. For example, the portions (371 and 374) of the expanded block (372) can be mapped to partial L-blocks (373 and 376) respectively as an initial response to expand the namespace (221); and subsequently, the mapping to the partial L-blocks (376) can be remapped to the available portion in L-block (237) from which the partial L-block (373) is allocated to form a full L-block (273) that is allocated to the namespace (221). Alternatively, the mapping to the partial L-blocks (373) can be remapped to the available portion in L-block (231) from which the partial L-block (376) is allocated to form a full L-block (231) that is allocated to the namespace (221). Alternatively, the partial L-blocks (373 and 376) can be remapped into another full free L-block.

To expand (363) the namespace (221) to include the partial block (375), a partial L-block (377) can be added to the namespace map (e.g., 135 or 273) in a way as illustrated in FIG. 14 for the addition of a partial block (367).

In a reverse direction, a namespace (221) having full blocks (241, 372) and a partial block (375) that are mapped to full L-blocks (233, 237) and a partial L-block (377) can be reduced (365) to have a full block (241) and a partial block (371) that are mapped to a full L-block (233) and a partial L-block (237) respectively, by returning the partial L-block (237) and a portion of the L-block (237) to a free block pool (160) and/or a free list (275) of full L-blocks.

Figure 16:
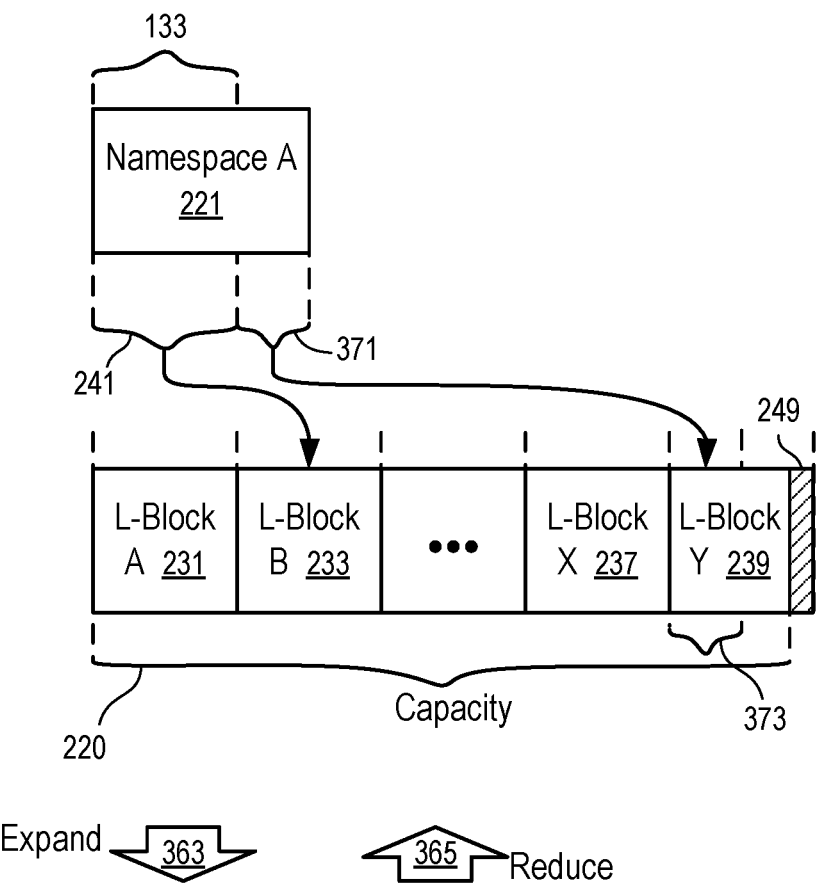
Figure 16:
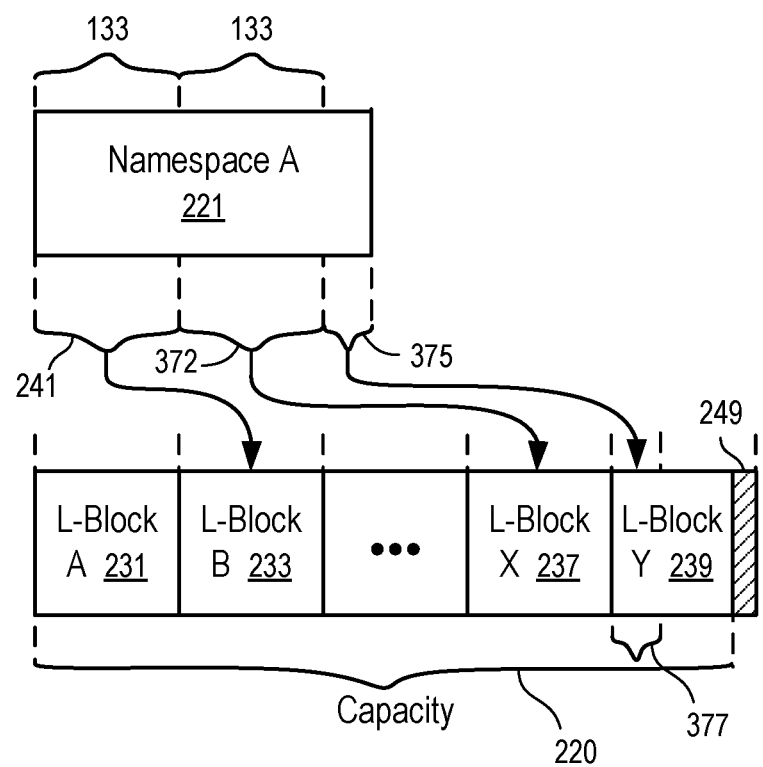

FIG. 16 shows an example of expanding a partial L-block to a full L-block through remapping.

In FIG. 16, a partial block (371) of the namespace (221) is initially mapped to a partial L-block (373) that is allocated from an L-block (239) that does not have sufficient free capacity to be expanded to accommodate a full block of the predetermined block size (133).

When the partial block (371) is expanded (363) into a full block (372), the partial L-block (373) allocated from the L-block (239) cannot be expanded in-place in L-block (239) to a full L-block due to the limitation in the L-block (239). In FIG. 16, the L-block (239) is limited as a result of the capacity (220) being not a multiple of the block size (133).

L-block (239) may be considered a partial L-block allocated from a full L-block that contains a portion (249) of virtual capacity that is not actually available in the non-volatile storage media (109). In other instances, the portion (249) may be available in the non-volatile storage media (109), but is currently allocated to another namespace, which prevents the in-place mapping expansion of the partial block (371).

In FIG. 16, when the partial block (371) is expanded (363) into the full block (372), the full block (372) is mapped to another L-block (237) instead of being mapped to the L-block (239) through local expansion. The partial L-block (373) initially allocated to the partial block (371) is freed, from which a partial L-Block (377) is allocated for the added partial block (375) of the namespace (221).

The L-block allocation example of FIG. 16 can be implemented by initially remap the partial block (371) to a partial L-block allocated from the L-block (237) and then expand the namespace (221) in a way as illustrated in FIG. 15. Alternatively, the added capacity of the namespace (221) is initially mapped to partial L-blocks that are subsequently consolidated into the full L-block (237) and the partial L-block (239) via remapping.

In the reverse direction, the namespace (221) can be reduced (365) from having full blocks (241, 372) and a partial block (375), mapped to full L-blocks (233, 237) and a partial L-block (377), to having a full block (241) and a partial block (371) that are mapped to an L-block (233) and a partial L-block (373). The reduction can be implemented via freeing the partial L-block (377), a portion of the L-block (237), and then remapping the remaining portion of the L-block (237) allocated to the block (371) to the partial L-block (373) in the L-block (239) (e.g., remapped to reduce fragmentation of the capacity (220)).

FIG. 17 illustrates remapping of a namespace.

In FIG. 17, the partial block (371) is remapped (379) from a partial L-block (373) allocated from one location in the capacity (220) to another partial L-block (378) allocated from another location in the capacity (220).

To implement the remapping illustrated in FIG. 17, the controller (107) executing the firmware (104) copies the data from the partial L-block (373) to the partial L-block (378), and replaces, in the namespace map (135 or 273) of the namespace (221), the identifier of the partial L-block (373) with the identifier of the partial L-block (378).

FIG. 17 illustrates an example of remapping a partial block (371) to different locations in the capacity (220). The technique can be similarly used to remap (379) full blocks (e.g., 241).

The remapping technique can be used to optimize namespace maps (e.g., 135, 273) such that full L-blocks (231, 233, . . . , 237) allocated for the namespace (221) are in a contiguous section on the capacity, and/or partial L-blocks (369) are combined to reduce the number of free partial L-blocks in the system.

Preferably, remapping is performed in the background to minimize the performance impact in data accessing. As the namespace maps (e.g., 135, 273) are optimized, the computation overhead associated with namespace mapping is reduced; and the data access performance of the storage device (103) is improved.

The techniques discussed above can be used to implement commands, received from the host (101) to change, expand, or shrink the requested namespace size (131) of an existing namespace (221) that has been mapped to the non-volatile storage media (109).

Further, the techniques discussed above can be used to implement thin provisioning of a namespace (221).

Figure 18:
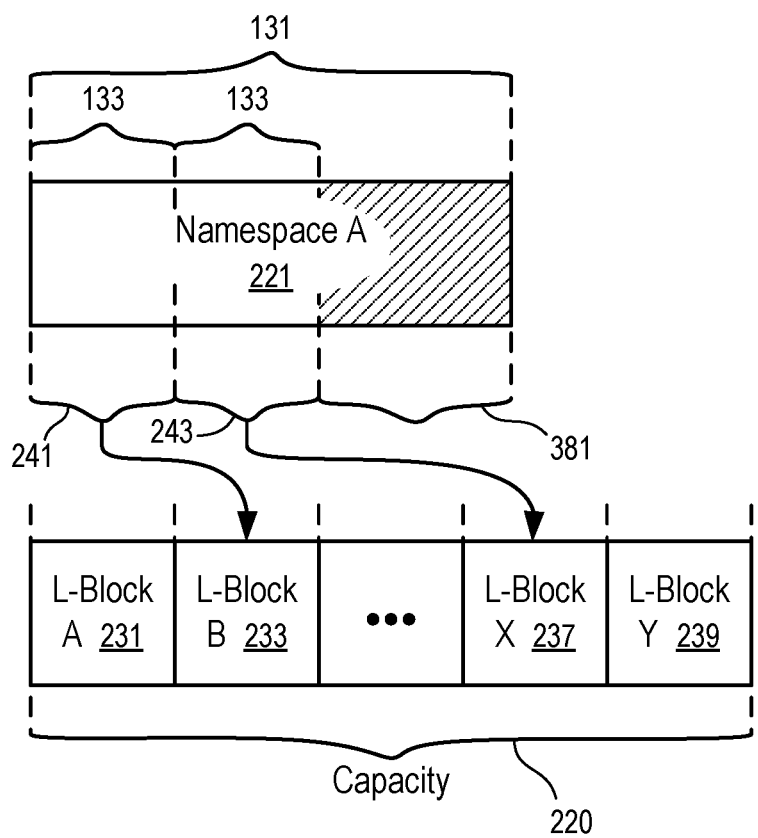
FIGS. 18 and 19 illustrate thin provisioning of a namespace via namespace mapping.
Figure 19:
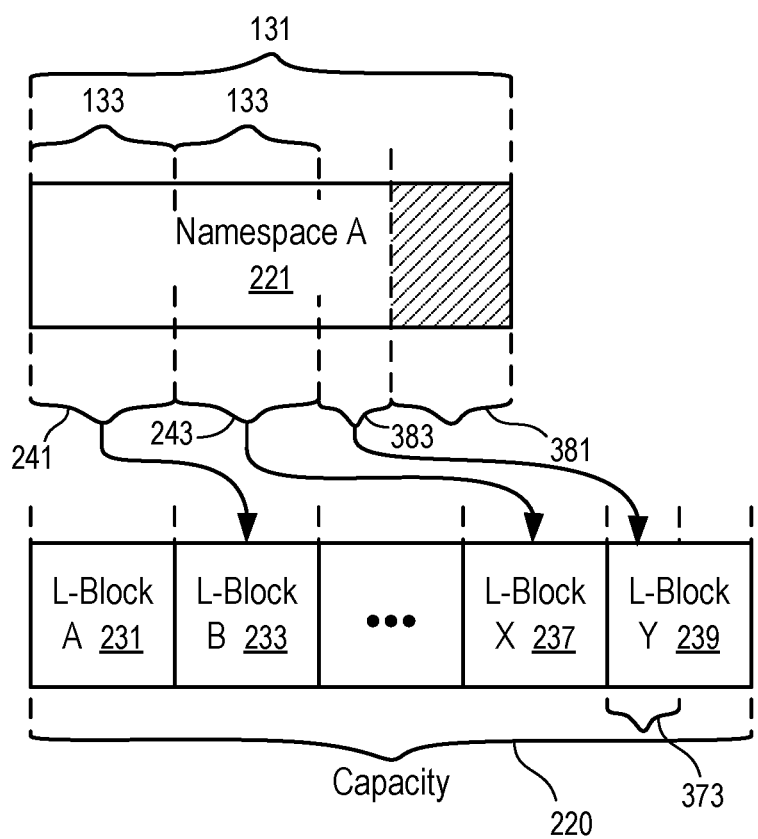

FIGS. 18 and 19 illustrate thin provisioning of a namespace via namespace mapping.

In FIGS. 18 and 19, the namespace (221) is created with a requested namespace size (131). However, only a portion of the namespace (221) (e.g., blocks 241 and 243) is initially allocated for the namespace (221) via its namespace map (e.g., 135, 273). For example, the blocks (241 and 243) are mapped to L-blocks (233 and 237) respectively; and the allocation of the remaining portion (381) of the namespace (221) is postponed until a later stage when additional storage capacity in the remaining portion (381) is needed.

In response to a need to use the remaining portion (381), a further partial block (383) (or a full block) of the namespace (221) is mapped to a partial L-block (373) (or a full L-block). Thus, the remaining unallocated portion (381) of the namespace (221) is reduced.

The incremental provisioning of the allocated portion of the namespace (221) can be managed automatically by the controller (107) with or without explicit requests from the host (101).

Figure 20:
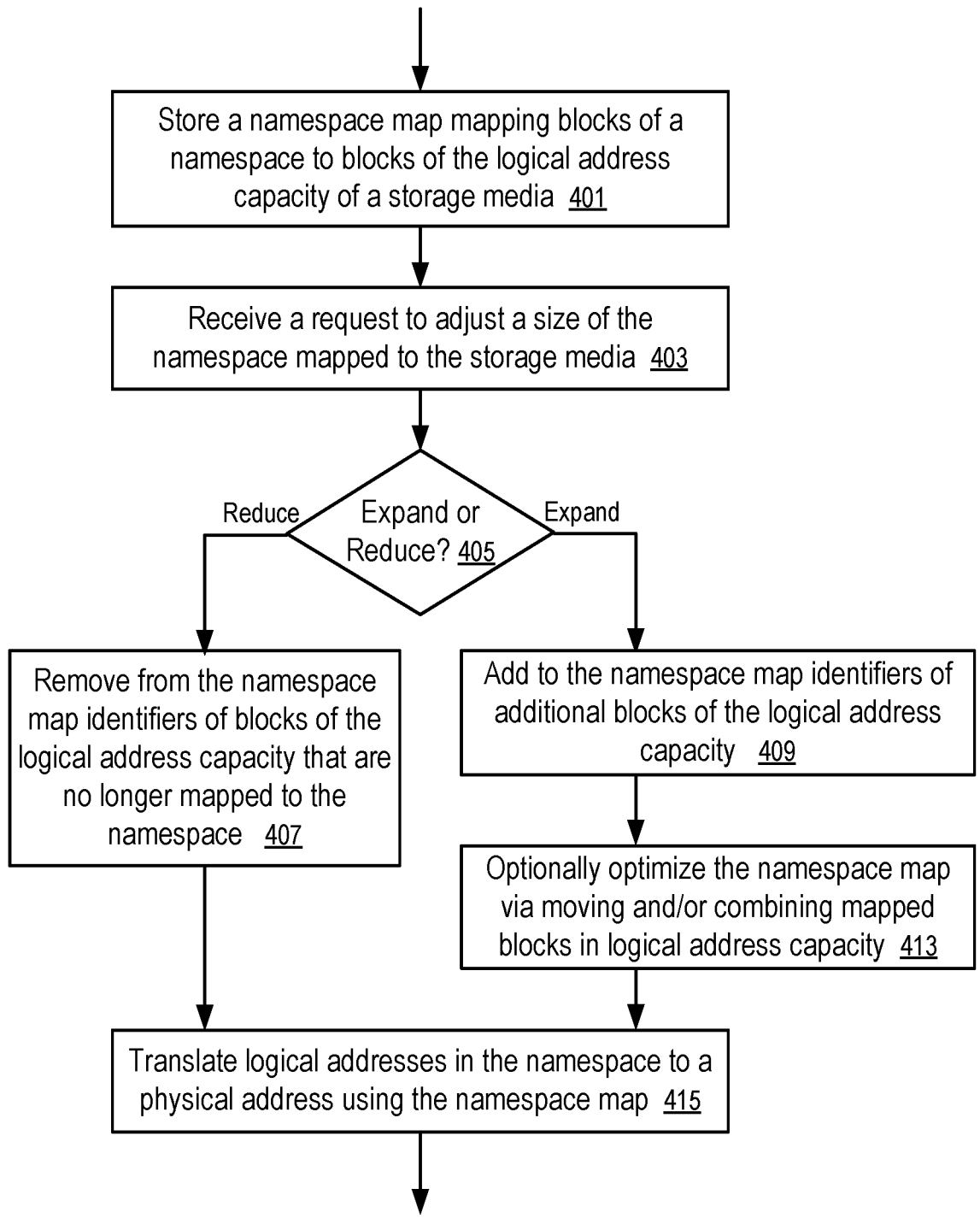
FIG. 20 shows a method to adjust a namespace via adjusting a namespace map.

FIG. 20 shows a method to adjust a namespace (e.g., 221) via adjusting a namespace map.

For example, the method of FIG. 20 can be used to implement the namespace changes illustrated in FIGS. 13-19 in a storage device (103) illustrated in FIG. 1 using data structures illustrated in FIGS. 4 and/or 8-10. For example, the method of FIG. 20 can be programmed via the firmware (104) and executed by the controller (107).

In FIG. 20, the method includes storing (401) a namespace map (e.g., 135 or 273) mapping blocks (e.g., 241, 383) of a namespace (221) to blocks (e.g., 233, 373) of the logical address capacity (220) of a non-volatile storage media (109). The namespace map (e.g., 135 or 273) can be created in response to allocating the namespace (221) (e.g., in a way as illustrated in FIG. 3, 7, or 11).

After receiving (403) a request to adjust a size of the existing namespace (221) mapped to the non-volatile storage media (109), the method determines (405) whether the request is to expand or reduce the allocation of the namespace (221) on the non-volatile storage media (109).

In response to a determination (405) to reduce the allocation of the namespace (221) on the non-volatile storage media (109), the method further includes removing (407) from the namespace map (e.g., 135, 273) identifiers of blocks of the logical address capacity that are no longer mapped/allocated to the namespace (221).

In response to a determination (405) to expand the allocation of the namespace (221) on the non-volatile storage media (109), the method further includes adding (409) to the namespace map (e.g., 135, 273) identifiers of additional blocks of the logical address capacity.

For example, as illustrated in FIG. 13, the identifier of a full L-block (239) is added to the namespace map (e.g., 135, 273) of the namespace (221) to expand the namespace (221) by the full block (361).

For example, as illustrated in FIG. 14, the identifier of a partial L-block (369) is added to the namespace map (e.g., 135, 273) of the namespace (221) to expand the namespace (221) by a partial block (367).

In some instances (e.g., as illustrated in FIG. 15), the identifier of a full L-block (e.g., 237) is added to replace the identifier of a partial L-block (e.g., 373) that is expanded to the full L-block (e.g., 237) in allocation.

Optionally, the method further includes optimizing (413) the namespace map (e.g., 135, 273) via moving and/or combining mapped blocks in logical address capacity (220). For example, the mapping of the partial block (371) on the capacity (220) may be moved from the partial L-block (373) to the partial L-block (378) illustrated in FIG. 17 to prepare the expansion of the partial block (371) to a full block, or to combine with a partial block allocated from the L-block (237) to accommodate the expansion of the partial block (371). For example, the mapping to the full L-blocks on the capacity (220) can be moved around to consolidate the full L-blocks allocated to the namespace (221) in a contiguous segment.

The method of FIG. 20 includes translating (415) logical addresses defined in the namespace (221) to mapped logical addresses (257) defined on the entire capacity (220) of the storage device (103) and then to physical addresses (259) using the namespace map (e.g., 135, 273).

For example, a logical address in a block (e.g., 241, 371) of the namespace can be linearly mapped to the corresponding address (257) in the L-block (e.g., 233, 378) of the capacity (220), which can then be further mapped to a physical address (e.g., 259) (e.g., by a Flash Translation Layer (FTL) of a solid state drive (SSDs)) in a way independent of namespaces.

For example, the computer storage device (103) illustrated in FIG. 1 has a host interface (105), a controller (107), non-volatile storage media (109), and firmware (104). The firmware (104) instructs the controller (107) to: store a namespace map (e.g., 135, 273) that maps blocks of logical addresses defined in a namespace (111 or 221) to blocks of a logical address capacity (220) of the non-volatile storage media (109); adjusts the namespace map (e.g., 135, 273) to change a size of the namespace (111 or 221); and translates logical addresses defined in the namespace (111 or 221) to physical addresses (259) for the non-volatile storage media (109) using the namespace map (e.g., 135, 273) that first maps the logical addresses defined in the namespace (111 or 221) to the logical addresses in the logical address capacity (220) of the non-volatile storage media (109).

The namespace map (e.g., 135, 273) can be adjusted in response to a request for a host (101) to increase (363) the size of the namespace (111 or 221), where the adjustment can be performed via adding an identifier of a block of the logical address capacity (220) for association with the namespace (111 or 221).

The namespace map (e.g., 135, 273) can be adjusted in response to a request for a host (101) to reduce (365) the size of the namespace (111 or 221), where the adjustment can be performed via removing an identifier of a block of the logical address capacity (220) from association with the namespace (111 or 221).

In implementing thin provisioning, the namespace map (e.g., 135, 273) can be adjusted in response to an increase in demand of allocated capacity of the namespace (111 or 221) with or without an explicit request from the host (101).

Preferably, the logical address capacity (220) of the non-volatile storage media (109) is divided into predetermined blocks having a same, predetermined block size (133) that is a power of two.

In one scenario, before the size of the namespace (111 or 221) is changed, the namespace (111 or 221) has a partial block (371) having a size smaller than the predetermined block size (133), and the partial block (371) is mapped by the namespace map (e.g., 135, 273) to a portion (373) of a first particular block (239) of the predetermined blocks. After the size of the namespace (111 or 221) is changed, the size of the partial block (371) is increased, and the expanded first block (372) is mapped by the namespace map (e.g., 135, 273) to at least a portion of a second particular block (237 or 239) of the predetermined blocks, as illustrated in FIGS. 15 and 16.

The second particular block can be different from the first particular block, as illustrated in FIG. 16.

To implement a scenario as illustrated in FIG. 16, the namespace map (e.g., 135, 273) can be adjusted via: copying data from the portion (373) of the first particular block (239) to a corresponding portion (378) of the second particular block (237) (e.g., as illustrated in FIG. 17); and replacing in the namespace map (e.g., 135, 273) an identifier of the portion (373) of the first particular block (239) with an identifier of the corresponding portion (378) of the second particular block (237). The allocation of the corresponding portion (378) of the second particular block (237) can then be expanded on the second particular block (237) to accommodate the expansion.

In an alternative way to implement a scenario as illustrated in FIG. 16, the namespace map (e.g., 135, 273) can be adjusted via: dividing the at least portion of the second particular block (237) into a first portion and a second portion, where the second portion (378) is reserved to receive a copy of the content from the portion (373) of the first particular block (239); and adding to the namespace map (e.g., 135, 273) an identifier of the first portion of the second particular block (237). After the size of the namespace (111 or 221) has changed, a background process is used to copy data from the portion (373) of the first particular block (239) to the second portion (378) of the second particular block (237). Subsequently, the controller (107) replaces in the namespace map (e.g., 135, 273) an identifier of the portion (373) of the first particular block (239) and the identifier of the first portion of the second particular block (237) with an identifier of the at least a portion of the second particular block (237).

After the size of the namespace (221) is changed, the size of the first block (371) can be increased to the predetermined block size (133); and a partial block identifier can be replaced with a full block identifier.

Preferably, the storage device is configured with a background process that reduces and/or eliminates fragmentation in allocated, or not yet allocated, logical addresses that defined on the capacity of the storage device such that gaps in logical addresses allocated to an existing namespace are reduced, and gaps in logical address available for allocation to a new namespace are reduced or eliminated. Further, the background process reduces or eliminates out of-sequence mapping.

Figure 21:
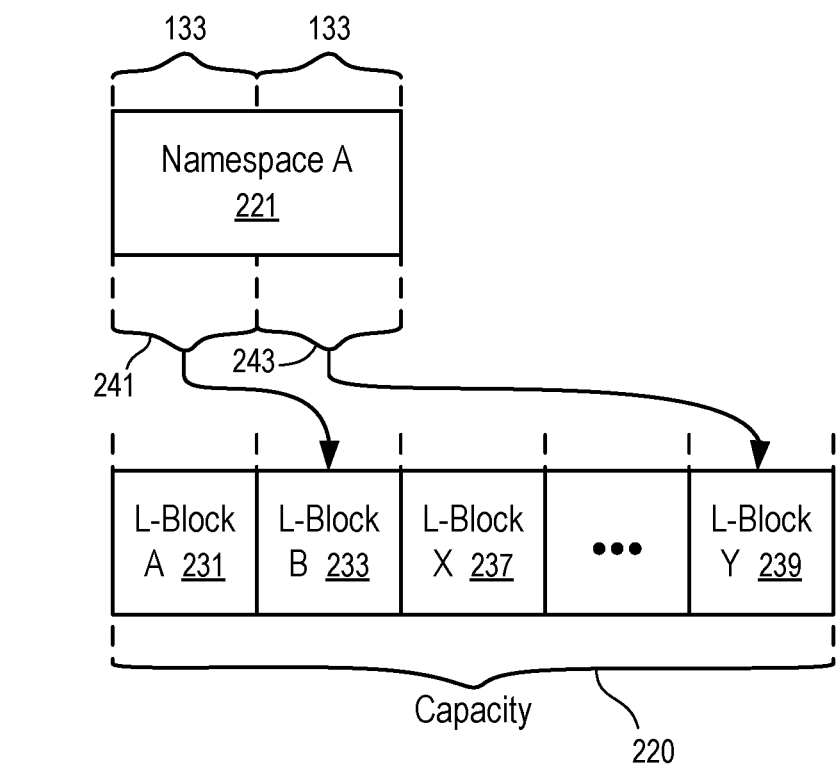
FIG. 21 illustrates a namespace map adjustment to remove a gap in mapped logical addresses.
Figure 21:
Figure 21:
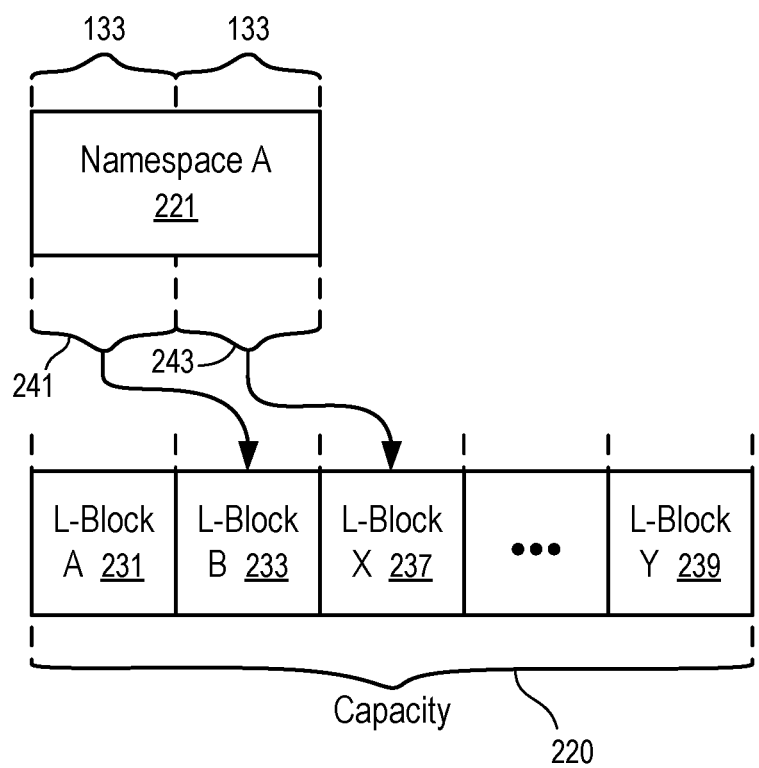

FIG. 21 illustrates a namespace map adjustment to remove a gap in mapped logical addresses.

Logical addresses in the L-blocks (231-239) are defined sequentially and continuously across the entire capacity (220) of the storage device. Logical addresses within each namespace (e.g., 221) are also defined sequentially and continuously within the corresponding namespace (e.g., 221). A namespace map (e.g., 273 in FIG. 4 or 135 in FIG. 8) maps each block (e.g., 241) of contiguous logical addresses defined in a namespace (221) to a corresponding L-block (e.g., 233) of contiguous logical addresses defined in the capacity (220). However, the mapped logical addresses as a whole may not be allocated to a namespace (221) from a contiguous region on the capacity (220).

For example, the L-blocks (223-239) allocated to namespace (221) in FIG. 21 are separated by L-blocks (237, . . . ), which may be a result of the deletion of a namespace.

To optimize data access performance and reduce the computation for the address mapping from the logical addresses defined in the namespace and the logical addresses defined on the capacity (220) independent of allocated namespaces, a background process running in the storage device (103) is configured to optimize the namespace mapping in a way illustrated in FIG. 21 by eliminating the gap(s) in L-blocks allocated to the namespace (221).

For example, in FIG. 21, the namespace mapping is changed from mapping from the namespace (221) to L-blocks (223 and 239) located in separate regions on the capacity (220) to L-blocks (223 and 237) located in a contiguous region on the capacity (220) of the storage device (103). After the optimization (421), the calculation of the logical address mapping can be simplified; and thus, the data access performance can be improved.

The adjustment as illustrated in FIG. 21 can be implemented via adjustments in mapping for logical addresses defined on the capacity (220) to physical addresses in the storage device (103). For example, a Flash Translation Layer (FTL) responsible for translating the logical addresses to physical addresses in the storage device (103) can be configured to organize its translation operations according to L-blocks. Thus, an instruction can be sent to the FTL to switch the translation for L-blocks (237 and 239) such that the physical addresses of the L-block (239) before the optimization (421) become the physical addresses of the L-block (237) after the optimization (421), and the physical addresses of the L-block (237) before the optimization (421) become the physical addresses of the L-block (239) after the optimization (421). In view of the change in the FTL address mapping from logical addresses defined in the capacity (220) and the physical addresses in accessing the allocated memory units in the storage device (103), the namespace map of the namespace (221) can be changed from mapping the block (243) to the L-block (239) to mapping the block (243) to the L-block (237) in a contiguous region of logical addresses defined on the capacity (220). When such a method to optimize the namespace map is implemented, the optimization (421) can be performed without moving or copying data from one set of physical memory units in the storage device (103) to another set of physical memory units in the storage device (103).

In some instances, a FTL responsible for translating the logical addresses to physical addresses in the storage device (103) is incapable of switching mappings for L-blocks. In such a situation, the background process may start a mirroring operation where a mirror copy of the L-block (239) is established on the L-block (237). In the mirroring operation, existing data stored in the L-block (239) is copied to the L-block (237); and further data written into the L-block (239) is also written into the corresponding addresses in the L-block (237). When the physical memory units identified by the logical addresses in L-block (237) contain the same data as the physical memory units identified by logical addresses in the L-block (239), the namespace map for the namespace (221) can be changed from being allocated to L-blocks (233 and 239) to being allocated to L-blocks (233 and 237), as illustrated in FIG. 21. After the optimization (421), no further mirroring is necessary. Thus, the mirroring operation can be stopped after the optimization (421). Such an implementation does not require a change in the FTL.

In some instances, the FTL may be capable of moving a portion of logical to physical address mapping from the L-block (239) to the L-block (233) but not a remaining portion without degradation in performance. The movable portion includes LBA addresses in the L-block (239) that are currently mapping to a first set of physical addresses; and the FTL mapping can be changed to remap the corresponding LBA addresses in the L-block (233) to the first set of physical addresses. The non-movable portion includes LBA addresses in the L-block (239) that are currently mapping to a second set of physical addresses; and the FTL mapping cannot be changed (without degradation in performance) to remap the corresponding LBA addresses in the L-block (233) to the second set of physical addresses. In such instances, mirroring can be performed on the remaining, non-movable portions without the need to performing mirroring the movable portion for improved efficiency. After mirroring on the non-movable portion and remap the movable portion, the namespace map adjustment as illustrated in FIG. 21 can be effectuated.

It is preferred that a namespace has no more than one partial L-block for improved data access efficiency. However, a namespace may have more than one partial L-block in some instances. Preferably, a background process is used to combine partial L-blocks allocated to a namespace, as illustrated in FIG. 22.

Figure 22:
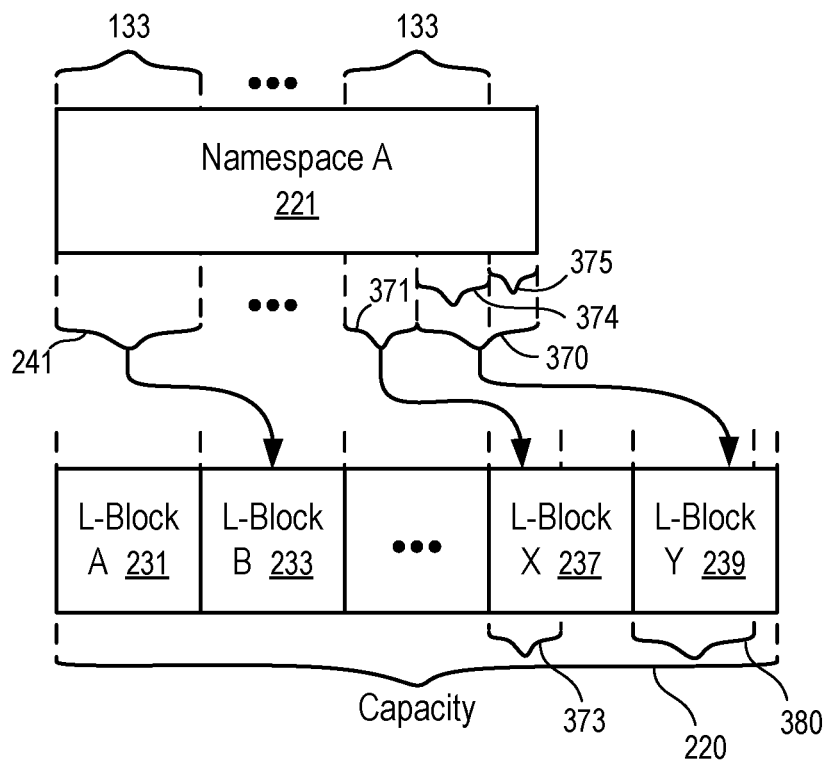
FIG. 22 illustrates a namespace map adjustment to reduce the number of partial blocks of a namespace.
Figure 22:
Figure 22:
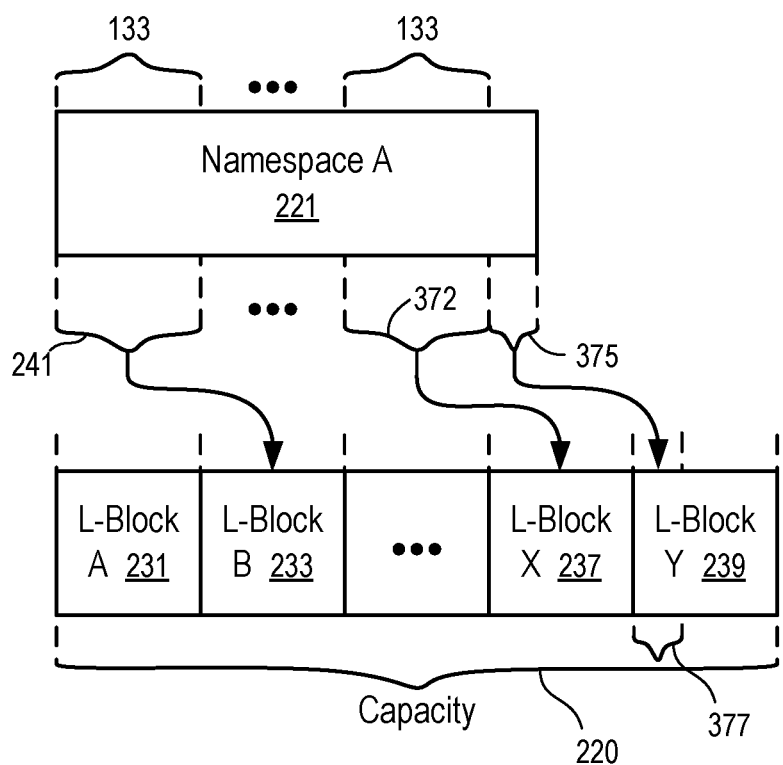

FIG. 22 illustrates a namespace map adjustment to reduce the number of partial blocks of a namespace.

The namespace (221) illustrated in FIG. 22 has two partial L-blocks (373 and 380) that are allocated from two different full L-blocks (237 and 239). The allocation can be a result of adding the logical addresses (370) to the namespace (221) that are mapped the logical addresses in the partial L-block (377) and the deletion of a namespace that had a partial L-block allocated from the L-block (237), or the remapping of a namespace that initially had a partial L-block allocated from the L-block (237).

After the optimization (421) in FIG. 22, a portion of the logical addresses in the block (370) is merged with the addresses in the block (371) to form a block (372) having the full size (133); the full block (372) of logical addresses is mapped to the full L-block (237); and the remaining logical addresses of the block (370) in the namespace (221) is mapped to a partial L-block (378) allocated from the L-block (239). Thus, the number of partial L-blocks allocated to the namespace (221) is reduced by one.

FIG. 22 illustrates an example where the number of logical addresses in the two partial L-blocks (373 and 380) is larger than the predetermined block size (133). Thus, the combination leads to the use of one full L-block (237) and a partial L-block (377). In general, the number of logical addresses in the two partial L-blocks can be smaller than the predetermined block size (133); and the combination leads to one combined partial L-block without adding a full block. In other cases, the number of logical addresses in the two partial L-blocks is equal to the predetermined block size (133); and thus the optimization (421) leads to the elimination of the two partial L-blocks after combining the partial L-blocks as a single full block.

The optimization (421) illustrated in FIG. 22 generally involves the move of the allocation of a portion of the logical addresses of the namespace (221) from a portion of an L-block (e.g., 239) to a portion of another L-block (e.g., 237), or from a portion of an L-block (e.g., 239) to another portion of the same L-block (e.g., 239).

For example, the logical addresses in the portion (374) of the namespace (221) is mapped to a portion of the L-block (239) before the optimization (421) and mapped to a portion of the L-block (237) after the optimization (421).

For example, the logical addresses in the portion (375) of the namespace (221) is mapped to a portion of the L-block (239) before the optimization (421) and mapped to a different portion of the L-block (239) after the optimization (421).

Preferably, the FTL is capable of adjusting its logical to physical address mapping for portions of L-blocks to effectuate the move(s) without performance degradation. Thus, the optimization (421) can be implemented via an instruction to cause FTL to change its mapping.

For example, before the optimization (421), the FTL translates the logical addresses in the partial L-block (380) to physical addresses in the storage device (103), including a first set of physical addresses for logical addresses translated from the portion (374) of the namespace (221) and a second set of physical addresses for logical addresses translated from the portion (375) of the namespace (221). During the optimization (421) (e.g., at a time the namespace (221) is not used), the FTL address mapping is updated to switch the translations for portions of the L-blocks (237). After the optimization (421), the FTL translates the logical addresses in the corresponding portion of the L-block (237) to the first set of physical addresses that correspond to the logical addresses in the portion (374) of the namespace (221) and translates the logical addresses in the partial L-block (377) allocated from the L-block (239) to the second set of physical addresses that correspond to the logical addresses in the portion (375) of the namespace (221). Thus, the optimization (421) can be performed without mirroring operations or copying or moving data stored in the namespace (221) in the storage device (103).

The FTL is capable of adjusting its logical to physical address mapping without performance degradation, the allocated portions of L-block addresses to the portions (374 and 375) of the namespace (221) can be implemented via copying, moving, or mirroring data for the namespace (221). In some instances, the copying, moving, or mirroring data can be combined with wear leveling operations of the controller (107).

Optimization of namespace maps can be performed not only to reduce or eliminate fragmentation of the logical addresses in the capacity (220) that are allocated to each namespace (e.g., 221), but also to reduce or eliminate fragmentation of free logical addresses in the capacity (220) that can be allocated to a new namespace.

Figure 23:
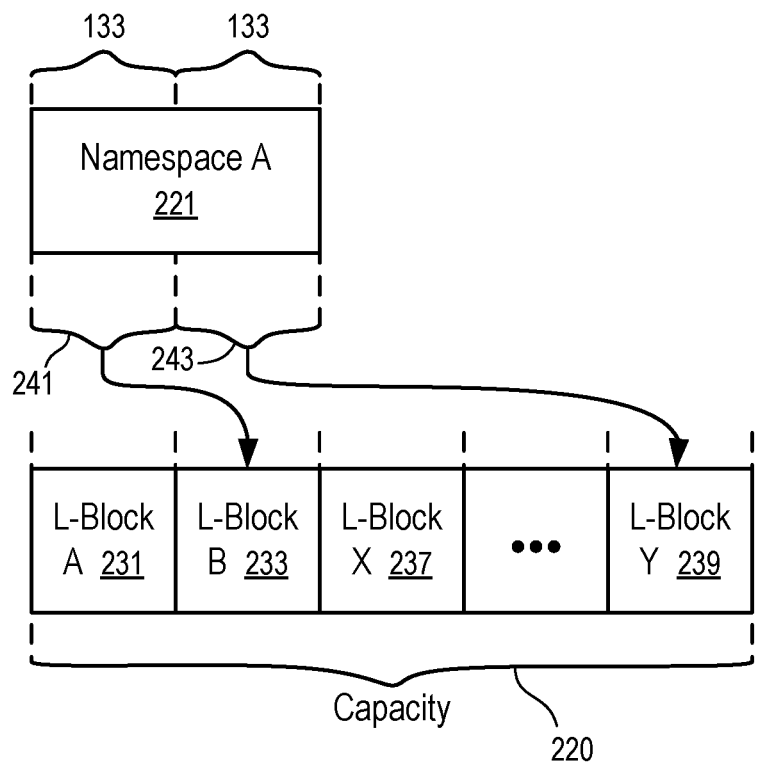
FIG. 23 illustrates a namespace map adjustment to reduce a gap in the mapped addresses of a namespace and consolidate available free blocks in a contiguous region.
Figure 23:
Figure 23:
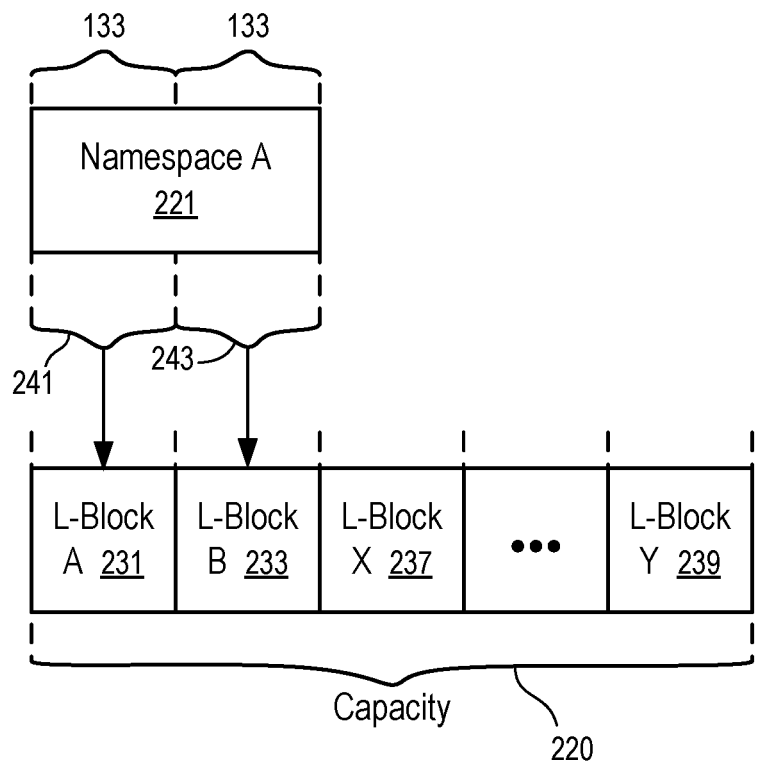

FIG. 23 illustrates a namespace map adjustment to reduce a gap in the mapped addresses of a namespace and consolidate available free blocks in a contiguous region.

Before the optimization (421) in FIG. 23, logical addresses in L-blocks (233 and 239) on the capacity (220) of the storage device (103) are allocated to the namespace (221) and are separated by logical addresses in L-blocks (237, ... ); and the free blocks (231, 237, ... ) are separated by allocated logical addresses in L-blocks (e.g., 233).

After the optimization (421) in FIG. 23, logical addresses are allocated from a contiguous set of logical addresses in L-blocks (231 and 233); and logical addresses available for allocation are in free L-blocks (237, ..., 239). Thus, the data access performance for namespace (221) is improved; and a new namespace can be created with optimal performance without a need for optimization operations.

Figure 24:
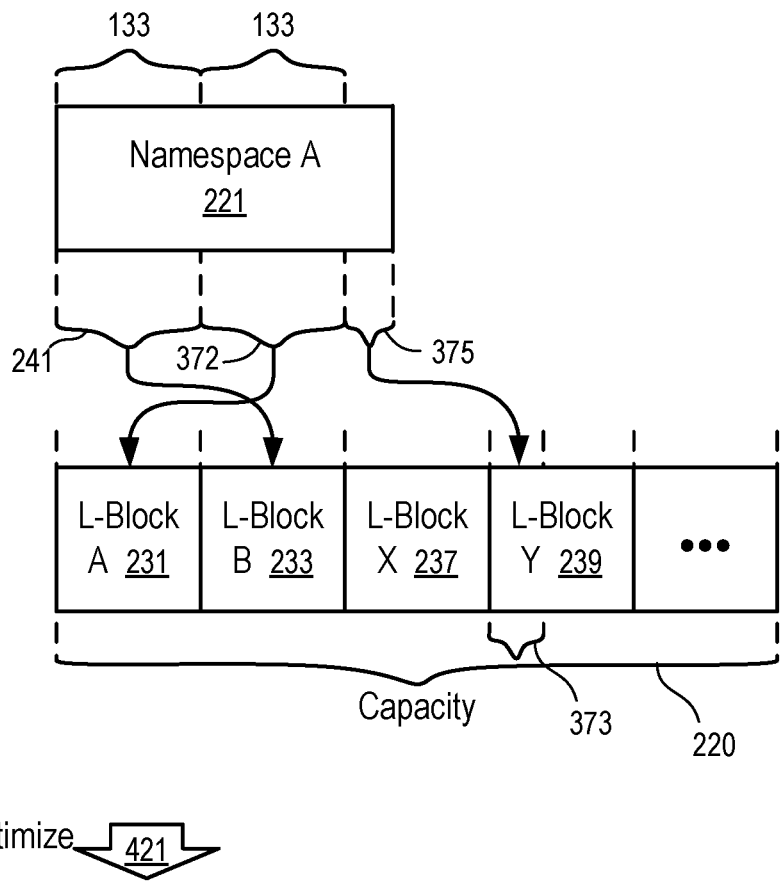
FIG. 24 illustrates a namespace map adjustment to improve contiguous and sequential mapping between logical addresses defined in a namespace allocated on a storage device and mapped logical addresses defined on the entire capacity of the storage device.
Figure 24:
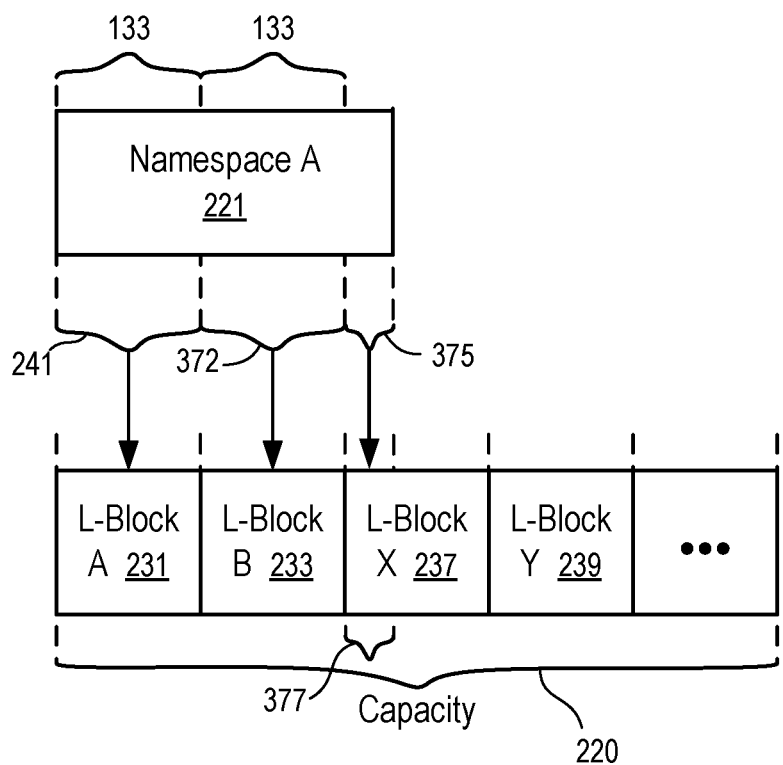

Optimization of namespace maps can be further performed to remove output of order mapping between the logical addresses in a namespace and the logical addresses in the capacity (220), as illustrated in FIG. 24.

FIG. 24 illustrates a namespace map adjustment to improve contiguous and sequential mapping between logical addresses defined in a namespace allocated on a storage device and mapped logical addresses defined on the entire capacity of the storage device.

Before the optimization (421) in FIG. 24, the logical addresses in each of the blocks (241, 372, 375) of the namespace (221) can be mapped linearly and sequentially to a corresponding block (233, 231, and 377) on the capacity (220). Even though the L-blocks (231 and 233) are allocated from a contiguous region of the capacity (220) for the namespace (221), the mapping of the blocks (241, 372) of the namespace (221) to the L-blocks (233 and 231) is out of sequence; and thus, the mapping of the logical addresses in the contiguous region of blocks (241 and 372) cannot be mapped linearly and sequentially to the contiguous region of L-blocks (233 and 231) on the capacity (220). Such a mapping scheme requires more processing time in data accessing in namespace (221).

After the optimization (421) in FIG. 24, the logical addresses in the contiguous region of blocks (241 and 372) can be mapped linearly and sequentially to the contiguous region of L-blocks (231 and 233) on the capacity (220). Thus, a more efficient computation method can be used to translate the logical addresses in the namespace (221) to the logical addresses on the capacity (220).

Further, the optimization (421) in FIG. 24, the logical addresses in the entire namespace, including blocks (241, 372, 375), can be mapped linearly and sequentially to a contiguous region of L-blocks (231, 233, 377) on the capacity (220). Thus, the computation for the logical address mapping between the namespace (221) and the capacity (220) can be further simplified for improved efficiency.

When there are sufficient free L-blocks for the allocation of the existing namespaces, it may be preferred to allocate each namespace entirely on a contiguous region on the capacity, where the contiguous region may include zero or more full L-blocks and at most one partial L-block in general. Partial L-blocks of different namespaces may be allocated from different full L-blocks. Thus, each of the namespaces can be accessed with optimal performance.

When an additional namespace is requested that cannot be satisfied with the existing free full L-blocks and a free partial L-block, multiple allocated partial L-blocks may be combined onto a L-block to free up one or more L-blocks for the allocation of the additional namespace. Alternatively, or in combination, multiple partial L-blocks may be allocated to the namespace; and a background process can be used to optimize the performance of the namespace by reducing the number of partial blocks (e.g., in a way as illustrated in FIG. 22).

Figure 25:
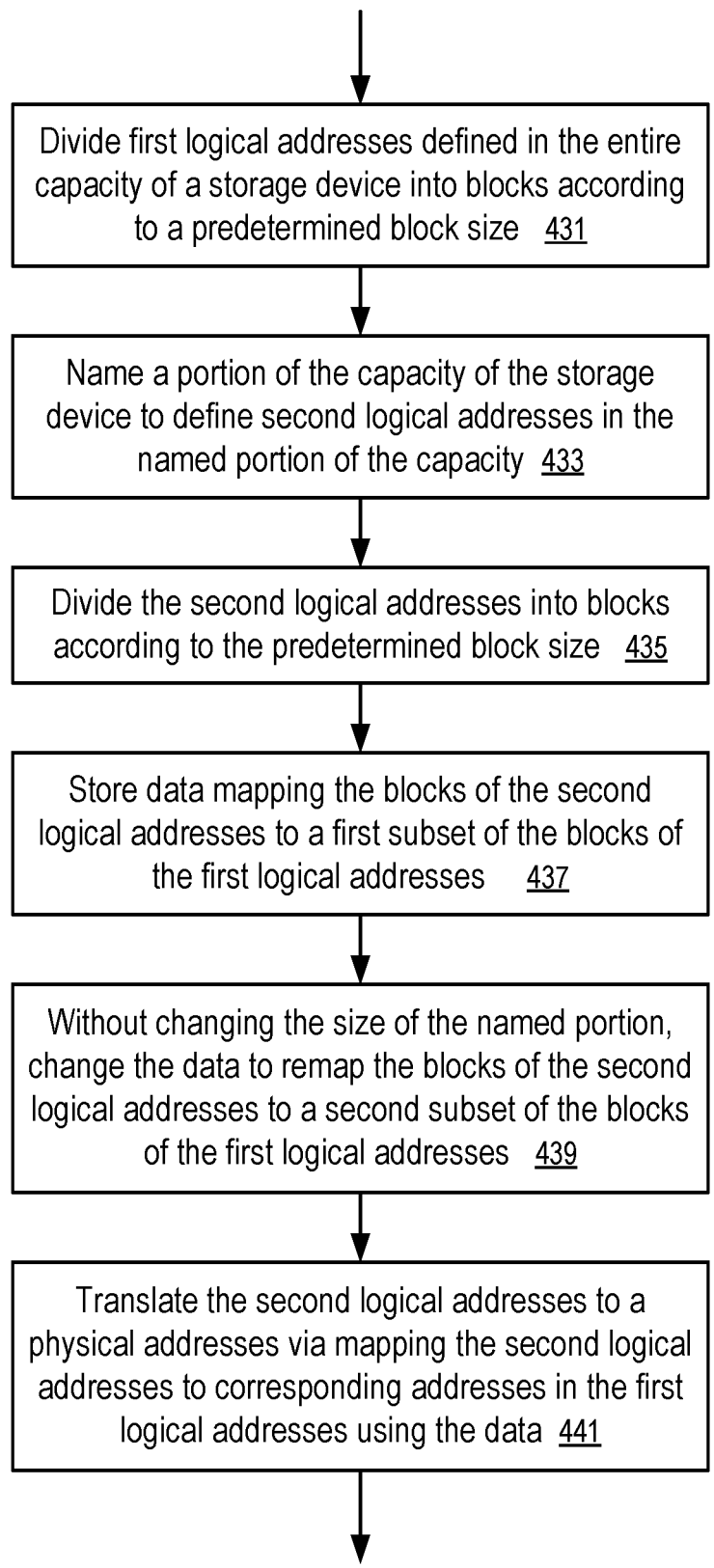
FIG. 25 shows a method to adjust conversion from logical addresses to physical addresses according to one embodiment.

FIG. 25 shows a method to adjust conversion from logical addresses to physical addresses according to one embodiment. For example, the method of FIG. 25 can be implemented in the storage device (103) illustrated in FIG. 1 using a namespace map (273) illustrated in FIG. 4, or a namespace map (135) illustrated in FIG. 8. For example, the storage device (103) can be configured (e.g., via the firmware (104) and the controller (107)) to perform the method of FIG. 25.

The method of FIG. 25 includes: dividing (431) first logical addresses defined in the entire capacity (220) of a storage device (103) into blocks (e.g., 231, 233, . . . , 237, 239) according to a predetermined block size (133); naming (433) a portion of the capacity (220) of the storage device (103) to define second logical addresses in the named portion (e.g., the namespace (221)) of the capacity (220); dividing (435) the second logical addresses into blocks (e.g., 241, 372, 375) according to the predetermined block size (133); storing (437) data (e.g., namespace map (273 or 135)) mapping the blocks of the second logical addresses to a first subset of the blocks of the first logical addresses (e.g., as illustrated in FIGS. 3, 7, 11, 13-19, and/or 21-24); without changing the size of the named portion, changing (439) the data (e.g., namespace map (273 or 135)) to remap the blocks of the second logical addresses to a second subset of the blocks of the first logical addresses (e.g., as illustrated in FIGS. 21-24); and translating (441) the second logical addresses to a physical addresses via mapping the second logical addresses to corresponding addresses in the first logical addresses using the data (e.g., namespace map (273 or 135)).

Preferably, the data (e.g., namespace map (273 or 135)) is changed (439) in a background process without impacting the current data access requests from the host (101). The change (439) is made to improve subsequent data access performances by reducing the computations involved in the translating (441) of the addresses. The computations can be removing gaps in the portion of the first logical addresses to which the second logical addresses are mapped. Further, removing gaps in the portion of the first logical addresses that are not mapped to from logical addresses defined in any existing named portions (allocated namespaces) of the capacity.

For example, before the change (439), logical addresses are not contiguous in the first subset of blocks; and after the change (439), logical addresses are contiguous in the second subset of blocks, as illustrated in FIGS. 21-24. Preferably, after the change (439) the second subset of the blocks of the first logical addresses is in a contiguous region on the capacity (220).

As illustrated in FIG. 24, sequential logical addresses in the namespace (221) are mapped to non-sequential logical addresses on the capacity (220) before the optimization (421) that changes the mapping; and after the change (439), the sequential logical addresses in the namespace (221) are mapped to sequential logical addresses on the capacity (220).

The use of partial L-blocks (e.g., 373, 380) increases computation in address translation. As illustrated in FIG. 22, the change (439) can be made such that the second subset of blocks has at least one fewer partial block than the first subset of blocks.

The change (439) can be made via changing the mapping between the first logical addresses defined in the entire capacity (220) of the storage device (103) and the physical addresses in the storage device (103). For example, before the change (439) logical addresses in the first subset of blocks are mapped to a set of physical addresses; and after the change (439) logical addresses in the second subset of blocks are mapped to the set of physical addresses.

The change (439) can be made via copying or mirroring data stored according to the second logical addresses defined in the named portion of the capacity (220) (e.g., namespace (221)). For example, before the change (439) logical addresses in the first subset of blocks are mapped to a first set of physical addresses; and logical addresses in the second subset of blocks are mapped to a second set of physical addresses. The data stored in the first set of physical addresses can be copied or mirrored to the second set of physical addresses such that after the change (439), the data can be accessed via mapping the second logical addresses to the second subset of blocks, instead of to the first subset of blocks.

The change (439) can be made via a combination of changing the mapping between the first logical addresses defined in the entire capacity (220) of the storage device (103) and the physical addresses in the storage device (103) for a portion of memory corresponding to the second logical addresses of the named portion and copying or mirroring data stored according to the second logical addresses defined in the named portion of the capacity (220) (e.g., namespace (221)) for another portion of memory corresponding to the second logical addresses of the named portion.

After an initial block size is used to define L-blocks for namespace mapping, an improved or optimized block size may be subsequently predicted or calculated, e.g., using an artificial intelligence technique and/or machine learning from the namespace usage histories in the storage device and/or other similarly used storage devices.

To apply a new block size for namespace mapping, the storage device regenerates the namespace maps for the existing namespaces to perform block-wise mapping according to the new block size. Preferably, the namespace maps are regenerated according to the new block size for efficient translation from logical addresses defined in the namespaces to logical addresses defined in a namespace-neutral way for the entire capacity of the storage device so that the translated logical addresses can be converted to physical addresses independent of namespaces.

Preferably, the new block size is a multiple of the old block size for block size increase; and the old block size is a multiple of the new block size for block size decrease. More preferably, each of the new and old block sizes is a power of two (2) to simplify computations involved in mapping of addresses for the L-blocks. A closest number that meets the preferences can be selected as the new block size.

When the new block size is a multiple of the old block size, multiple adjacent full L-blocks of the old block size can be combined into one full L-block of the new block size to implement block size increase.

When the old block size is a multiple of the new block size, each full L-block of the old block size can be split into multiple full L-blocks of the new block size to implement block size decrease.

When an L-block of the new block size is only partially allocated to an existing namespace, a partial L-block allocated from the L-block of the new block size can be initially identified and used in the new namespace map of the existing namespace. Subsequently, a namespace map optimization operation can be performed in the background to reduce the number of partial L-blocks allocated to the namespace and/or consolidate L-blocks allocated to the namespace in a contiguous region.

In general, changing the block size may increase the number of partial blocks in the updated namespace map of an existing namespace, from no more than one, to more than one. Optionally, a background process can be used to optimize the updated namespace maps generated according to the new block size and reduce the number of partial blocks to no more than one. For example, the optimization can be performed using the techniques discussed above in connection with FIGS. 21-25 to reduce the number of partial blocks, consolidate L-blocks that are allocated to a same namespace in a contiguous region of logical addresses defined in the capacity of the storage device, and/or consolidate free L-blocks in a continuous region of logical addresses defined in the capacity of the storage device.

Preferably, a background process of optimization is performed before the application of the new block size to namespace mapping, to move the position of full and/or partial L-blocks that are allocated to an existing namespace in the capacity of the storage device and to at least reduce the increase in the number of partial blocks caused by applying the new block size. For example, the L-blocks of the old block size allocated to a namespace can be adjusted such that the logical addresses in the L-blocks are the same as the logical addresses in L-blocks of the new block size after the optimization is applied to the new namespace. For example, the optimized L-blocks of the new block size can be calculated before applying the new block size to determine the preferred L-blocks of the old block size; and after adjusting the namespace map of the namespace to the preferred L-blocks of the old block size, the new block size can be applied to map the namespace to the optimized L-blocks of the new block size.

Figure 26:
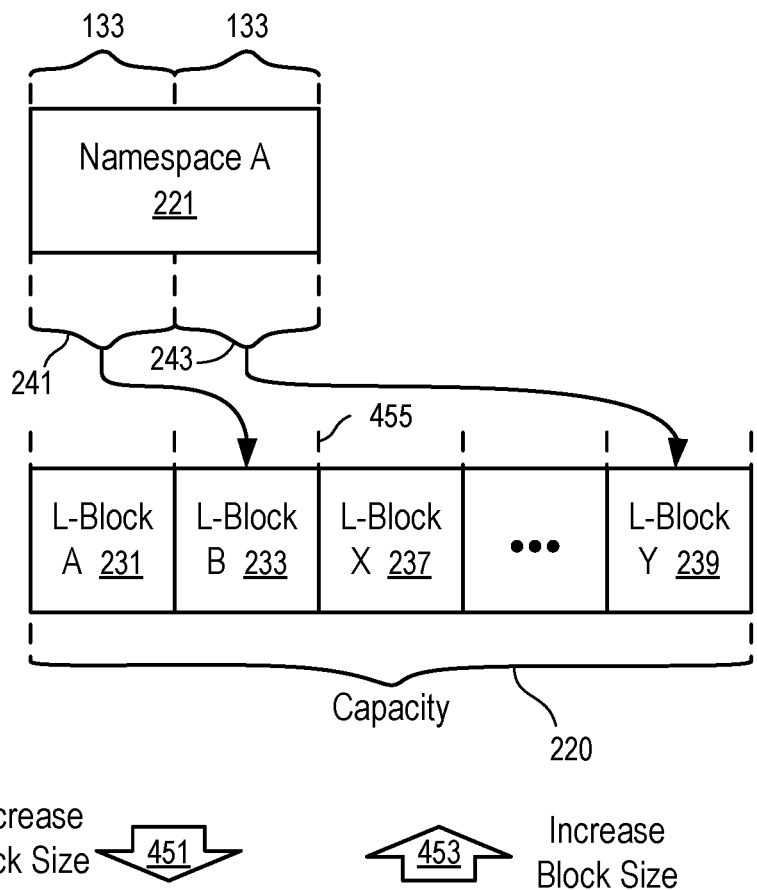
FIG. 26 illustrates block size changes for namespace mapping.
Figure 26:
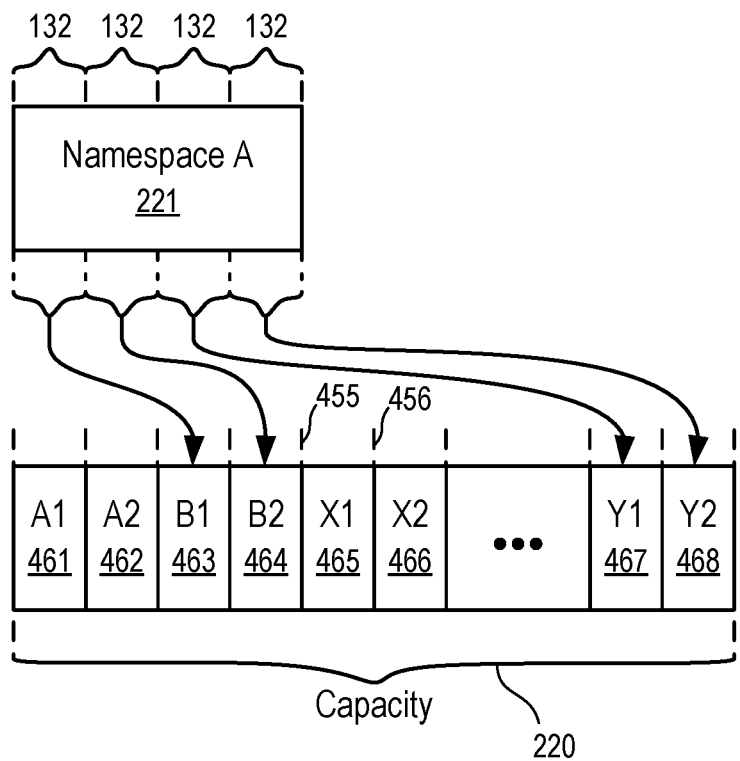

FIG. 26 illustrates block size changes for namespace mapping.

In FIG. 26, a large block size (133) is a multiple of a small block size (132). The capacity (220) of the storage device (103) is divided into a set of large L-blocks (231, 233, 237, . . . , 239) according to the large block size (133) and divided into another set of small L-blocks (461, 462, 463, 464, 465, 466, . . . , 467, 468) according to the small block size (132).

In decreasing (451) from the large block size (133) to the small block size (132), the block boundaries (e.g., 455) between adjacent large L-blocks (231, 233, 237, . . . , 239) remain as some of the block boundaries of adjacent small L-blocks (461, . . . , 468). Additional block boundaries (e.g., 456) are added to further split the large L-blocks (231, 233, 237, . . . , 239) into the small L-blocks (461, . . . , 468).

In increasing (453) from the small block size (132) to the large block size (133), some of the block boundaries of adjacent small L-blocks (461, . . . , 468) remain as the block boundaries (e.g., 455) between adjacent large L-blocks (231, 233, 237, . . . , 239). Other block boundaries (e.g., 456) are removed to combine adjacent small L-blocks (461, . . . , 468) into the respective large L-blocks (231, 233, 237, . . . , 239).

When the capacity (220) is divided according to the large block size (133), the namespace (221) in FIG. 26 is mapped to a set of full large L-blocks (233 and 239). Since the set of logical addresses in the full large L-blocks (223 and 239) is the same as the set of logical addresses in the full small L-blocks (463, 464, 467 and 468), the namespace map of the namespace (221) can be simply updated, from mapping to full large L-blocks (233 and 239), to mapping to full small L-blocks (463, 464, 467 and 468) to implement the block size decrease (451). Similarly, to implement the block size increase (453), the namespace map of the namespace (221) can be simply updated, from mapping to full small L-blocks (463, 464, 467 and 468), to mapping to full large L-blocks (233 and 239).

In general, when a large L-block (e.g., 233) that is allocated to a namespace (e.g., 221) is split into multiple small L-blocks (e.g., 463 and 464), the small L-blocks (e.g., 463 and 464) of the small block size (132) are also allocated to the namespace (e.g., 221). Thus, the update of the namespace map for the namespace (e.g., 221) for the block size decrease (451) is simplified for the allocated full blocks (e.g., 233).

However, when multiple small L-blocks (e.g., 463 and 464) are combined into a large L-block (e.g., 233) in block size increase (453), there can be instances where some of the multiple small L-blocks (e.g., 463 and 464) are allocated to the namespace (e.g., 221) and some of the multiple small L-blocks (e.g., 463 and 464) are not allocated to the namespace (e.g., 221). As a result, the L-block (e.g., 233) is only partially allocated to the namespace (e.g., 221).

For example, when the small block size (132) is used, the namespace (221) may be mapped to L-blocks (464 and 465), instead of L-blocks (463 and 464). L-block (463) may be a free block, or mapped to another namespace (e.g., 223). In such a situation when L-blocks (463 and 464) are merged as a large L-block (233) and L-blocks (465 and 466) are merged as a large L-block (237) after the block size increase (453), the namespace (221) is mapped to a portion of the large L-block (233) and a portion of the large L-block (237).

Optionally, before the block size increase (453), the namespace map of the namespace (221) is adjusted (e.g., through a background process for optimization) to remap the namespace (221) such that the small full L-blocks used by the namespace (221) are consolidated according to the large L-blocks defined according to the large block size (133). For example, instead of using small L-blocks (464 and 465) that are in different large L-blocks (233 and 237), the namespace (221) can be remapped to use small L-blocks (463 and 464) that are in one large L-block (223). After the remapping operation (e.g., using the technique discussed above in connection with FIGS. 21-24), the number of large L-blocks that are partially used by the namespace (221) as a result of the block size increase (453) is reduced.

FIG. 26 illustrates an example where the size of the namespace (221) is both a multiple of the small block size (132) and a multiple of the large block size (133). Thus, it is possible to remap the namespace (221) to the small L-blocks (463, 464, 467, and 468) such that after the block size increase (453), the namespace (221) is not mapped to a large L-block that is only partially used by the namespace (221).

However, when the size of the namespace (221) is not both a multiple of the small block size (132) and a multiple of the large block size (133), the namespace (221) uses at least one large L-block that is only partially used by the namespace (221). A partial L-block can be allocated from the partially used large L-block and used in the namespace (221), using the technique discussed above in connection with FIGS. 7-10.

In some implementations, a background optimization of the namespace map of the namespace (221) is performed before the block size change (453) such that after the block size increase (453), the namespace (221) uses no more than one partial L-block allocated from the large L-blocks (231, 233, 237, ..., 239).

Optionally or in combination, the optimization can be performed after the block size increase (453). For example, when the namespace (221) uses small L-blocks (464 and 465) that are portions of large L-blocks (223 and 227), two partial L-blocks can be initially allocated from the large L-blocks (223 and 227) for the namespace (221) to implement the block size increase (453). Subsequently, the partial L-blocks allocated to the namespace (221) can be remapped to one large L-block (e.g., 223) using a technique discussed above in connection with FIG. 22. Optionally, the optimized namespace map that uses the large L-block (e.g., 223) is pre-calculated before the actual block size increase (453) to determine the corresponding optimized namespace map that uses the small L-blocks (e.g., 463 and 464) generated from splitting the large L-block (e.g., 223) used in the optimized namespace map. A background optimization process can then be applied to change from the current namespace map of the namespace (221) to the optimized namespace map, before the block size increase (453).

FIGS. 27-30 illustrate namespace mapping adjustments in implementing block size changes.

In FIG. 27, a large L-block (239) has a portion (373) that is allocated to a namespace (e.g., 221) as a partial block (373) before the block size decrease (451). Since the partial block (373) corresponds to a full small L-block (471) having the small block size (132), the full small L-block (471) is allocated to the namespace (e.g., 221) after the block size decrease (451). Thus, the use of a partial block is eliminated for the namespace (e.g., 221) after the block size decrease (451).

When the adjacent small L-blocks (471 and 472) are merged into the large L-block (239) for the block size increase (453), the large L-block (239) may be only partially allocated to the namespace (e.g., 221), as illustrated in FIG. 27. For example, in a situation where one small L-block (471) is allocated to the namespace (e.g., 221) and another small L-block (472) is allocated to another namespace (e.g., 223), or is free for allocation to another namespace (e.g., 223), a partial block (373) is allocated from the large L-block (239) for the namespace (e.g., 221) after the block size increase (453).

FIG. 28 illustrates a situation where a partial L-block (373) allocated to a namespace (e.g., 221) is divided into a full small L-block (471) and a partial L-block (473) allocated from an adjacent small L-block (472) after the block size decrease (451). To implement the block size decrease (451), the namespace map of the namespace (e.g., 221) is updated to include the full small L-block (471) and the partial L-block (473) allocated from the adjacent full small L-block (472).

In a block size increase (453) in FIG. 28, the partial L-block (473) allocated to a namespace (e.g., 221) is merged with the adjacent L-block (471) to form a partial L-block (373) that is allocated from the large L-block (239) and used in the updated namespace map of the namespace (e.g., 221).

FIG. 29 illustrates a situation where a partial L-block (373) allocated to a namespace (e.g., 221) has a size smaller than the small block size (132). After the block size decrease (451), the portion (373) of the large L-block (239) allocated to the namespace (e.g., 221) is still a portion (473) of a small L-block (471). Thus, a partial L-block (473) is allocated from the small L-block (471) to the namespace (e.g., 221) after the block size decrease (451); and the namespace map of the namespace (e.g., 221) is updated accordingly to implement the block size decrease (451).

In a block size increase (453) in FIG. 29, a partial L-block (373) is allocated from the large L-block (239) for the namespace (e.g., 221), after the small L-blocks (471 and 472) are merged as the large L-block (239).

FIG. 30 illustrates a situation where a partial L-block (373) allocated from a large L-block (239) is split into two partial L-blocks (473 and 474) after the block size decrease (451). In FIG. 30, none of the boundaries of the partial block (373) allocated to a namespace (e.g., 221) is aligned with the boundaries of the large L-block (239) and the boundaries of the small L-blocks (471 and 472). Since the partial block (373) spans across a boundary between the small L-blocks (471 and 472), two partial L-blocks (473 and 474) are allocated from small L-blocks (471 and 472) to the namespace (e.g., 221) as a result of the block size decrease (451). In FIG. 30, the portion (475) of the L-block (239) may be allocated to another namespace (e.g., 223) or have been freed from another namespace (e.g., 223). Optimization can be performed after the block size decrease (451) to reduce the number of partial blocks assigned to the namespace (e.g., 221).

Alternatively, before the block size decrease (451), optimization is performed for the partial block (373) allocation from the large L-block (239) such that at least one of the boundary of the partial block allocated to the namespace (e.g., 221) is aligned with some of: the boundaries of the large L-block (239), and the boundaries of the small L-blocks (471 and 472). When such an optimization is performed, the block size decrease (451) does not cause the partial L-block (373) of the namespace (e.g., 221) to be split into more than one partial L-block allocated from small L-blocks (e.g., 471, 472).

Figure 31:
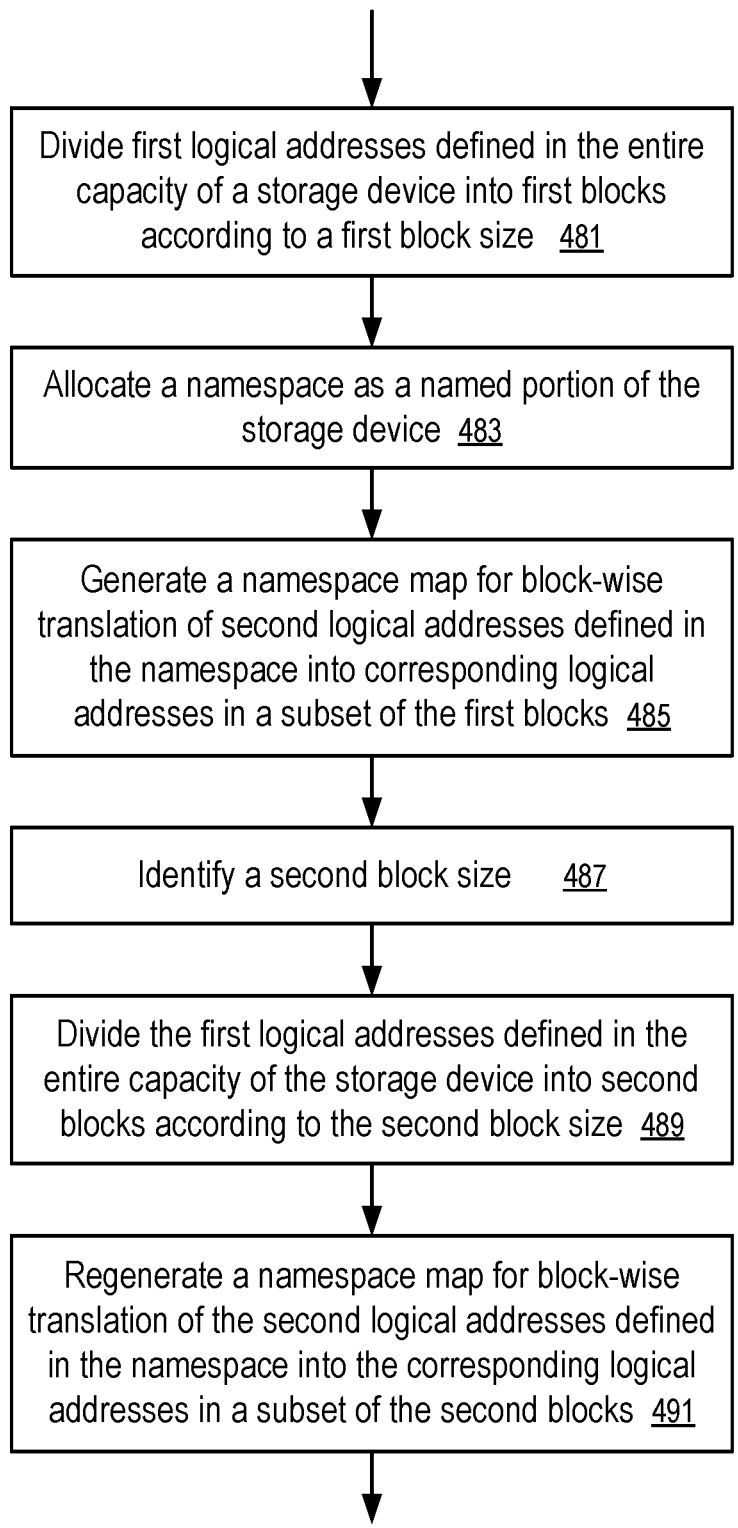
FIG. 31 shows a method to adjust a block size for namespace mapping.

FIG. 31 shows a method to adjust a block size for namespace mapping. For example, the method of FIG. 31 can be implemented in a storage device (103) illustrated in FIG. 1 with namespace map adjustments illustrated in FIGS. 26-30.

The method of FIG. 31 includes: dividing (481) a set of first logical addresses defined in the entire capacity (220) of a storage device (103) into first blocks (231, 233, 237, . . . , 239) according to a first block size (133); allocating (483) a namespace (221) as a named portion of the storage device (103); generating (485) a namespace map (e.g., 273, 135) for block-wise translation of a set of second logical addresses defined in the namespace (221) into logical addresses in a subset (e.g., 233, 239) of the first blocks (231, 233, 237, . . . , 239); identifying (487) a second block size (132); dividing (489) the set of first logical addresses defined in the entire capacity (220) of the storage device (103) into second blocks (461, . . . , 468) according to the second block size (132); and regenerating (491) a namespace map (e.g., 273, 135) for block-wise translation of the second logical addresses defined in the namespace (221) into the corresponding logical addresses in a subset (e.g., 463, 464, 467, 468) of the second blocks (461, . . . , 468) of the first logical addresses defined in the entire capacity (220) of the storage device (103).

Preferably, the second block size is determined to be a power of two (2); if the second block size is smaller than the first block size, the first block size is a multiple of the second block size; and if the second block size is larger than the first block size, the second block size is a multiple of the first block size.

Preferably, the namespace map of the namespace is optimized before or after the block size change to reduce the number of partial blocks used in the namespace map after the block size change.

A non-transitory computer storage medium can be used to store instructions of the firmware (104). When the instructions are executed by the controller (107) of the computer storage device (103), the instructions cause the controller (107) to perform a method discussed above.

In this description, various functions and operations may be described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor or microcontroller, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

A tangible, non-transitory computer storage medium can be used to store software and data which, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine-readable medium in their entirety at a particular instance of time.

Examples of computer-readable storage media include, but are not limited to, recordable and non-recordable type media such as volatile and non-volatile memory devices, read only memory (ROM), random access memory (RAM), flash memory devices, floppy and other removable disks, magnetic disk storage media, and optical storage media (e.g., Compact Disk Read-Only Memory (CD ROM), Digital Versatile Disks (DVDs), etc.), among others. The instructions may be embodied in a transitory medium, such as electrical, optical, acoustical or other forms of propagated signals, such as carrier waves, infrared signals, digital signals, etc. A transitory medium is typically used to transmit instructions, but not viewed as capable of storing the instructions.

In various embodiments, hardwired circuitry may be used in combination with software instructions to implement the techniques. Thus, the techniques are neither limited to any specific combination of hardware circuitry and software, nor to any particular source for the instructions executed by the data processing system.

Although some of the drawings illustrate a number of operations in a particular order, operations that are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computer storage device, comprising:
   a host interface;
   a controller;
   non-volatile storage media; and
   firmware containing instructions which, when executed by the controller, instruct the controller to at least:
   generate a first namespace map mapping blocks of first logical addresses defined in a namespace to first blocks of second logical addresses defined for an entire capacity of the non-volatile storage media, the first blocks of second logical addresses comprising non-contiguous blocks;
   translate the first logical addresses defined in the namespace to physical addresses for the non-volatile storage media using the first namespace map;
   generate a second namespace map mapping blocks of the first logical addresses defined in the namespace to second blocks of the second logical addresses defined for the entire capacity of the non-volatile storage media, the second blocks of the second logical addresses comprising contiguous blocks;
   translate, via a flash translation layer, the first logical addresses defined in the namespace to the physical addresses for the non-volatile storage media using the second namespace map.

2. The computer storage device of claim 1, further comprising generating a first data mapping, according to a first block size, wherein the first blocks have no more than one block of a size different from the first block size.

3. The computer storage device of claim 2, further comprising determining a second block size and generating a second data mapping according to the second block size, wherein the second blocks have no more than one block of a size different from the second block size.

4. The computer storage device of claim 3, wherein the second block size is a multiple of the first block size.

5. The computer storage device of claim 3, wherein the first block size is a multiple of the second block size.

6. The computer storage device of claim 3, wherein the first block size is a power of two and the second block size is a power of two.

7. The computer storage device of claim 3, wherein the instructions are configured to further instruct the controller to:
   before generating the second namespace map, adjust the first namespace map such that the second namespace map is generated with no more than one block having a size different from the second block size.

8. The computer storage device of claim 7, wherein the first namespace map is adjusted in a background process.

9. The computer storage device of claim 3, wherein the second blocks have more than one block of a size different from the second block size; and the instructions are configured to further instruct the controller to:
   adjust the second namespace map such that the second namespace map has no more than one block having a size different from the second block size.

10. The computer storage device of claim 9, wherein the second namespace map is adjusted in a background process.

11. The computer storage device of claim 1, wherein the first logical addresses defined in the namespace are translated to the physical addresses for the non-volatile storage media by:
    translating the first logical addresses in the corresponding logical addresses in the namespace first blocks; and
    translating, independent of namespace, the corresponding logical addresses to the physical addresses.

12. A method implemented in a computer storage device having a non-volatile storage media, the method comprising:
    generating a first data mapping blocks of first logical addresses defined in a named portion of the non-volatile storage media to first blocks of second logical addresses defined for an entire capacity of the non-volatile storage media, the first blocks of second logical addresses comprising non-contiguous blocks;
    translating the first logical addresses defined in the named portion of the non-volatile storage media to physical addresses for the non-volatile storage media using the first data;
    generating a second data mapping blocks of the first logical addresses defined in the named portion of the non-volatile storage media to second blocks of the second logical addresses defined for the entire capacity of the non-volatile storage media, the second blocks of the second logical addresses comprising contiguous blocks;
    translating, via a flash translation layer, the first logical addresses defined in the namespace to the physical addresses for the non-volatile storage media using a second namespace map.

13. The method of claim 12, wherein the computer storage device has a plurality of named portions of the non-volatile storage media.

14. The method of claim 13, further comprising determining a second block size and generating the second data mapping according to the second block size, wherein the second block size is determined based on a usage history of the computer storage device.

15. The method of claim 13, further comprising determining a second block size and generating the second data mapping according to the second block size, wherein the second block size is determined based on usage histories of a plurality of storage devices.

16. The method of claim 15, generating a first data mapping, according to a first block size wherein the first block size is a multiple of the second block size; and the second data is obtained by splitting the first blocks to identify the second blocks.

17. The method of claim 16, wherein the second block size is a multiple of the first block size; and the second data is obtained by combining the first blocks to identify the second blocks.

18. The method of claim 17, wherein at least one of the second blocks is identified as a portion of a block having the second block size.

19. The method of claim 18, further comprising:
adjusting the first data to consolidate first blocks in the second blocks such that the second blocks have only one block that is smaller than the second block size.

20. A non-transitory computer storage medium storing instructions which, when executed by a controller of a computer storage device having a non-volatile storage media, cause the controller to perform a method, the method comprising:
generating a first data mapping blocks of first logical addresses defined in a named portion of the non-volatile storage media to first blocks of second logical addresses defined for the non-volatile storage media in entirety, the first blocks of second logical addresses comprising non-contiguous blocks;
translating the first logical addresses defined in the named portion of the non-volatile storage media to physical addresses for the non-volatile storage media using the first data;
generating a second data mapping blocks of the first logical addresses defined in the named portion of the non-volatile storage media to second blocks of the second logical addresses defined for the non-volatile storage media in entirety; and
translating, via a flash translation layer, the first logical addresses defined in the named portion of the non-volatile storage media to the physical addresses for the non-volatile storage media using a second namespace map.

* * * * *